United States Patent
Morozov et al.

(10) Patent No.: US 8,634,276 B2
(45) Date of Patent: *Jan. 21, 2014

(54) TUNABLE BUBBLE SOUND SOURCE

(75) Inventors: Andrey K. Morozov, Falmouth, MA (US); Douglas C. Webb, Falmouth, MA (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/493,125

(22) Filed: Jun. 11, 2012

(65) Prior Publication Data

US 2013/0010573 A1    Jan. 10, 2013

Related U.S. Application Data

(63) Continuation-in-part of application No. 13/053,095, filed on Mar. 21, 2011, now Pat. No. 8,331,198, and a continuation of application No. 13/418,017, filed on Mar. 12, 2012, now Pat. No. 8,441,892, which is a continuation-in-part of application No. 13/053,095, filed on Mar. 21, 2011, now Pat. No. 8,331,198.

(60) Provisional application No. 61/597,150, filed on Feb. 9, 2012.

(51) Int. Cl.
    *G01V 1/143* (2006.01)
    *G01V 1/145* (2006.01)

(52) U.S. Cl.
    USPC ............ 367/143; 367/141; 367/142; 181/120

(58) Field of Classification Search
    USPC .......... 367/140–142, 166, 171; 181/113, 115, 181/119–120
    See application file for complete search history.

(56) References Cited

U.S. PATENT DOCUMENTS

| | | |
|---|---|---|
| 2,901,997 A | 9/1959 | Brooks |
| 3,056,104 A | 9/1962 | De Kanski et al. |
| 3,105,456 A | 10/1963 | Gongwer |
| 3,194,207 A | 7/1965 | Dunne |
| 3,219,970 A | 11/1965 | Sims |
| 3,578,102 A | 5/1971 | Ross et al. |
| 3,676,840 A | 7/1972 | Bays |
| 3,720,908 A | 3/1973 | McCoy et al. |
| 4,135,142 A | 1/1979 | Percy et al. |
| 4,142,171 A | 2/1979 | Pickens |
| 4,198,706 A | 4/1980 | Elliott |
| 4,396,088 A | 8/1983 | Bayhi |
| 4,400,805 A | 8/1983 | Nadler |

(Continued)

OTHER PUBLICATIONS

International Search Report and Written Opinion for PCT/US2012/029807, mailed Jun. 13, 2012, 9 pages.

(Continued)

*Primary Examiner* — Ian J Lobo
(74) *Attorney, Agent, or Firm* — K&L Gates LLP

(57) ABSTRACT

A sound source includes a bubble configured to be filled with a gas. The sound source also includes an actuator configured to perturb the gas within the bubble by changing the volume of the gas without adding gas to or removing gas from the bubble. The sound source also includes a processing circuit configured to provide a control signal to the actuator to cause the actuator to perturb the gas within the bubble at a frequency defined by the control signal.

18 Claims, 17 Drawing Sheets

(56) References Cited

U.S. PATENT DOCUMENTS

| | | | |
|---|---|---|---|
| 4,646,276 | A | 2/1987 | Kowalewski et al. |
| 4,855,964 | A | 8/1989 | Fanning et al. |
| 4,961,175 | A | 10/1990 | Blue et al. |
| 4,961,181 | A | 10/1990 | Elliott |
| 5,210,718 | A | 5/1993 | Bjelland et al. |
| 5,999,491 | A | 12/1999 | Harvey et al. |
| 6,076,629 | A | 6/2000 | Tengham |
| 6,085,862 | A | 7/2000 | Tenghamn |
| 6,782,109 | B2 | 8/2004 | Sheplak et al. |
| 7,266,046 | B1 | 9/2007 | Ruffa |
| 7,633,835 | B1 | 12/2009 | Erikson et al. |
| 2006/0059801 | A1 | 3/2006 | Allaei |
| 2010/0039900 | A1 | 2/2010 | McAleenan et al. |
| 2012/0243378 | A1* | 9/2012 | Morozov et al. ............... 367/143 |

OTHER PUBLICATIONS

Decarpigny et al., The Design of Low-Frequency Underwater Acoustic Projectors: Present Status and Future Trends, IEEE Journal of Oceanic Engineering, vol. 16, No. 1, Jan. 1991, 16 pages.

Ensign et al., Electroacoustic Performance Modeling of the Gas-Filled Bubble Projector, Presented at Third International Workshop on Transducers for Sonics and Ultrasonics, May 6-8, 1992, Naval Research Lab, Orlando, Florida, 8 pages.

Kramer et al., Seismic Energy Sources, First Annual Offshore Technology Conference, Houston, Texas, May 18-21, 1969, Paper No. OTC 1119, 30 pages.

Morozov et al., A Sound Projector for Acoustic Tomography and Global Ocean Monitoring, IEEE Journal of Oceanic Engineering, vol. 28, No. 2, Apr. 2003, 12 pages.

Sims, Bubble Transducer for Radiating High-Power Low-Frequency Sound in Water, The Journal of the Acoustical Society of America, vol. 32, No. 10, Oct. 1960, 4 pages.

Duda et al., Evaluation of a Long-Range Joint Acoustic Navigation / Thermometry System, Proceedings of Oceans, 2006, 6 pages.

Freitag et al., Under-Ice Acoustic Communications and Navigation for Gliders and AUVs, American Geophysical Union, Fall Meeting 2009, abstract #OS43B-1389, Feb. 2009, 1 page.

Morozov et al., Underwater Tunable Organ-Pipe Sound Source, J. Acoust. Soc. Am. 122 (2), pp. 777-785, Aug. 2007, 9 pages.

Morozov et al., Underwater Acoustic Technologies for Long-Range Navigation and Communications in the Arctic, taken from URL: http://promitheas.iacm.forth.gr/UAM_Proceedings/view_paper.php?pageid=384, Jun. 2011, 8 pages.

Morozov et al., Underwater Sound Source with Tunable Resonator for Ocean Acoustic Tomography, J. Acoust. Soc. Am. 116, p. 2635, 2004, 3 pages.

Sagen et al., Acoustic Technologies for Observing the Interior of the Arctic Ocean, OceanObs '09, Venice, Italy, Sep. 2009, 5 pages.

Webb et al., A New Approach to Low Frequency Wide-Band Projector Design, Proceedings of Oceans, 2002, pp. 2342-2349, 10 pages.

* cited by examiner

TUNABLE BUBBLE SOUND SOURCE

CROSS-REFERENCE TO RELATED APPLICATIONS

This application is a continuation of U.S. application Ser. No. 13/418,017, filed Mar. 12, 2012, which is a continuation-in-part of U.S. application Ser. No. 13/053,095, filed Mar. 21, 2011, and claims the benefit of U.S. Provisional Application No. 61/597,150, filed Feb. 9, 2012. This application is also a continuation-in-part of U.S. application Ser. No. 13/053,095, filed Mar. 21, 2011. The entireties of U.S. application Ser. Nos. 13/418,017 and 13/053,095, and U.S. Provisional Application No. 61/597,150 are hereby incorporated by reference.

BACKGROUND

Low frequency acoustic and seismo-acoustic projectors find applications in underwater ocean acoustic tomography, long-range acoustic navigation and communications and deep-bottom penetration seismic profiling in the offshore oil and gas industry. Such sources may be used in Arctic under-ice acoustic far-range navigation and communications, underwater global positioning systems (RAFOS), and long-range ocean acoustic tomography and thermometry. Low-frequency underwater sound sources should be powerful and efficient.

The low frequency source can be an explosive (dynamite), or it can use more complicated technology like an air gun providing single pulses, or like vibroseis providing continuous frequency sweeps. Some acoustic sources in use for seismic applications, such as air gun, plasma (sparker) sound sources and boomers, are of the impulse type, where the transmitter emits a large non-coherent pressure pulse during a short time interval. Seismic air-gun surveys, such as those used in the exploration of oil and gas deposits underneath the ocean floor, produce loud, sharp impulses that propagate over large areas and increase noise levels substantially. Their signal is not highly controllable, either in frequencies content or repeatability. Coherent sound sources such as marine vibroseis can be much quieter and potentially less harmful for marine environments and should be used instead of air-guns in certain exploration activities. Current continuous wave type sources make use of hydraulic, pneumatic, piezo-electric or magneto-strictive drivers and different type of resonance systems to store acoustic energy and to improve impedance matching, when generating low-frequency sound waves in water. The power output of a simple acoustic source is proportional to the squares of volume velocity and frequency and needs a large vibrating area to achieve reasonable levels. As a result, the sound source can become unacceptably large and expensive.

SUMMARY

According to one embodiment, a sound source includes a bubble configured to be filled with a gas. The sound source also includes an actuator configured to perturb the gas within the bubble by changing the volume of the gas without adding gas to or removing gas from the bubble. The sound source also includes a processing circuit configured to provide a control signal to the actuator to cause the actuator to perturb the gas within the bubble at a frequency defined by the control signal.

According to another embodiment, a method of generating underwater sound waves includes providing an elastic bubble filled with a gas into an underwater environment. The method also includes perturbing the gas within the bubble by periodically changing the volume of the bubble without adding gas to or removing gas from the bubble. The method also includes controlling the perturbing of the gas within the bubble to emit sound waves over a plurality of frequencies.

BRIEF DESCRIPTION OF THE DRAWINGS

FIG. 13B is a cross-sectional view of the sound source of FIG. 13A, according to an exemplary embodiment.

FIG. 13C is a cross-sectional view of the sound source of FIG. 13A from an elevated angle, according to an exemplary embodiment.

FIG. 13D is a view of the exterior of the sound source of FIG. 13A from an elevated angle, according to an exemplary embodiment.

FIG. 13E is a cross-sectional view of the sound source of FIG. 13A from directly above the sound source, according to an exemplary embodiment.

FIG. 13F is a cross-sectional view of the sound source of FIG. 13A from the side and along the length of the sound source, according to an exemplary embodiment.

DETAILED DESCRIPTION OF EXEMPLARY EMBODIMENTS

Some embodiments described herein may provide a simple and less expensive engineering solution for a large volume, low-frequency resonance system. Some embodiments described herein may provide an improved radiated power and/or an improved radiated impedance, as reflected to a driver. Some embodiments described herein may provide for increased electro-acoustical efficiency. Some embodiments described herein may provide for a lighter, smaller, and lower cost sound source. Some embodiments described herein may provide a coherent signal that is less damaging to marine life.

Some embodiments described herein may enlarge the frequency band covered by a resonator by tuning a narrow-band resonator over a large range of frequencies. Some embodiments described herein may be a coherent type of sound source suitable for 5-100 Hz frequency range. Some embodiments described herein may cover the 5-100 Hz frequency band by tuning a narrow-band, high efficiency sound projector over the necessary frequency band. Some embodiments described herein may be tuned without changing buoyancy, which may be more convenient when the resonator is towed. Some embodiments described herein may work at lower frequencies with the same physical dimensions. Some embodiments described herein may have no moving parts in water, which may increase the reliability of the resonator.

Figure 1:
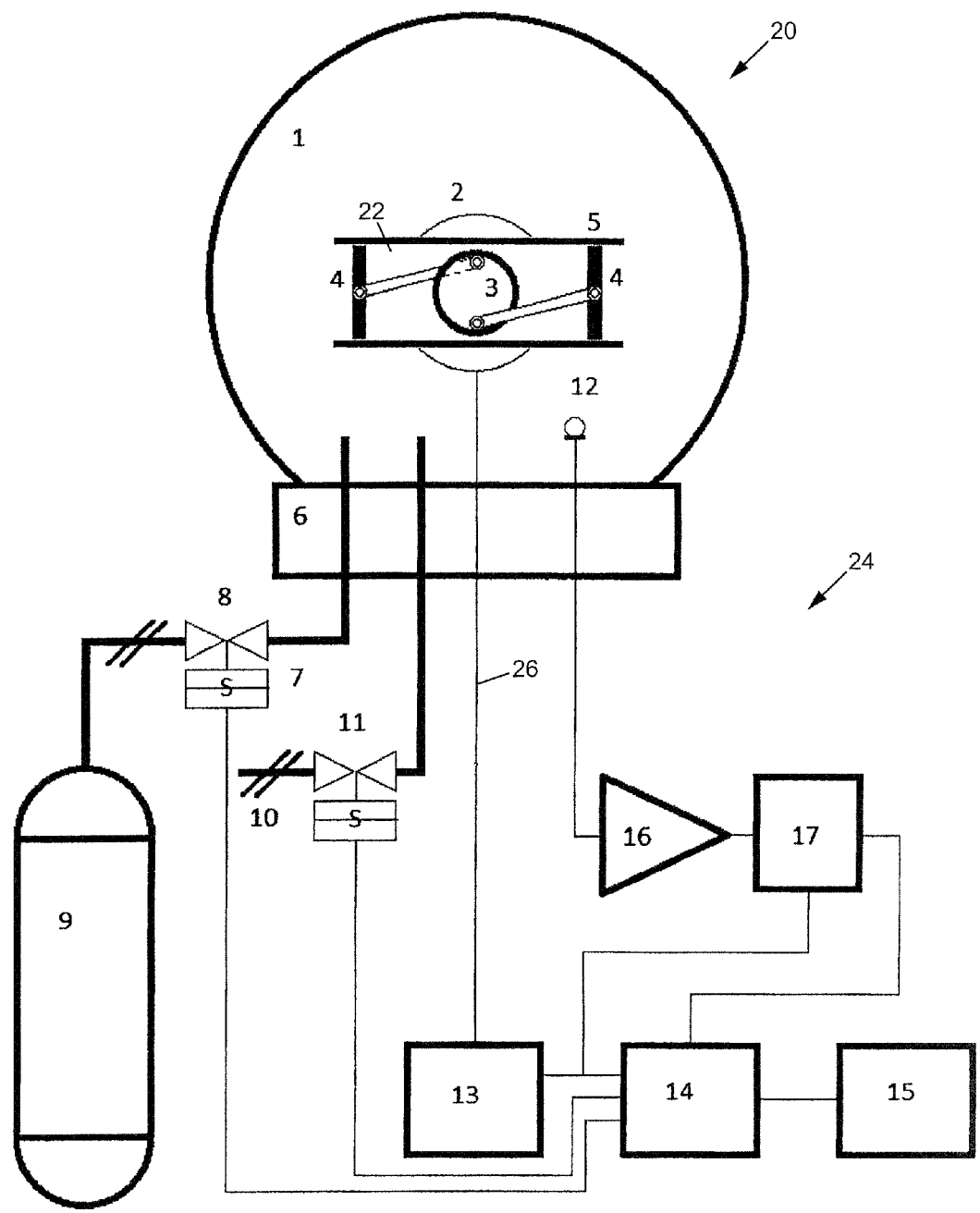
FIG. 1 is a block diagram showing a sound source and control system, according to an exemplary embodiment.

Referring first to FIG. 1, a gas-filled bubble sound source or resonator 20 is shown. Source 20 comprises a bubble, balloon or air bag 1, which may be a gas-filled bubble sound source. The gas may be air, Nitrogen, or other gases. For example, Nitrogen may be used for deep water and air may be used for shallow water. Bubble 1 may be manufactured from an elastic material, such as fiber reinforced latex, chloroprene, neoprene, buna rubber, etc. The elastic material may be selected to have a very low level of gas leakage for long-term deployments. Source 20 comprises a base, end-cap or interface 6 configured to seal a portion of bubble 1 and to further provide conduits for electrical and mechanical inputs and outputs to bubble 1. Source 20 may be a coherent source of changeable or changing volume velocity (velocity per area).

Source 20 comprises an actuator or driver 5 shown in this embodiment in the form of a symmetrical piston system placed or disposed inside or within the bubble volume (though it may be disposed outside of or on a surface of the bubble in alternative embodiments). Actuator 5 may be any actuator configured to perturb bubble 1, for example in a manner that will cause bubble 1 to vibrate or oscillate so that energy will be exchanged between the pressure of the gas inside and the inertia of the water at the surface of bubble 1. Actuator 5 may be a mechanically-driven actuator in this exemplary embodiment. Actuator 5 comprises a crankshaft 3 driven by an electrical motor 2 which in turn drives a plurality of symmetrically moving pistons 4. Electrical motor 2 may be a rotary motor with a crankshaft or a linear motor attached directly to moving pistons. Two moving pistons are provided in this embodiment, though three, four, or more pistons or other moving members may be used in alternative embodiments. In this embodiment, pistons 4 are configured to move synchronically in opposite directions. The moveable members may be configured to move in a same plane but opposed in any direction. Actuator 5 may be configured to make very small changes in pressure within bubble 1, relative to pressure changes made by the gas supply system described below. A housing 22 may be a cylindrical housing or other shape configured to define an internal area between pistons 4 sealed for air pressure. The internal area is subjected to a fluctuating pressure from the moving pistons 4. The electrical motor driver 2 is controlled by control signal from a computer (processing circuit 14) and synchronized with a digitally synthesized signal waveform. The waveform of the control signal may be a sine wave, or other waveform. The processing circuit 14 may be configured to generate the control signal in response to a programmed algorithm set by an operator of source 20, for example to control source 20 to provide a single frequency output, plurality of frequency outputs, etc. over one or more time periods. In one example, the actuator 5 is disposed within the bubble, for example, in a configuration where water surrounding bubble 1 does not come into contact with the actuator, or in contact with either side of housing 22 or with either of pistons 4.

Source 20 further comprises a computer controlled gas supply system 24 configured to regulate the volume and/or pressure of gas inside bubble 1 in proportion to a transmitted signal from a processing circuit 14. Gas supply system 24 comprises a tank 9 with compressed air or liquid Nitrogen connected to bubble 1 with air pipes 7 via a solenoid controlled valve 8. Tank 9 may be disposed proximate bubble 1 or via an extended conduit or hose to a pump on a ship deck on a surface of the water. Gas supply system 24 is configured to fill bubble 1 with gas from external tank 9 or from the ship through an underwater air hose and to release gas through a solenoid controlled release valve or vent 11 and pressure release pipe 10. Gas supply 24 may further comprise a processing circuit 14 configured to control solenoids S of valve 8 and vent 11 and an electrical driver 13 configured to drive actuator 5. Processing circuit 14 may be coupled to a precision clock 15. The precision of clock 15 may depend on stability demand. For example, a temperature-compensated crystal oscillator (TCXO) provides ±1 ppm frequency stability over the −40° C. to +85° C. industrial temperature range. As another example, clock 15 may be a Rubidium or Cesium atomic clock with stability better than 0.0001 ppm. As another example, a chip scale atomic clock (CSAC) may be used, such as a Symmetricom SA.45s having a precision of ±5.0E-11.

A sensor, microphone, or hydrophone 12 is coupled to an analog-digital converter (ADC) input of processing circuit 14. Sensor 12 is disposed inside bubble 1 and provides a feedback signal to processing circuit 14. Processing circuit 14 is configured to keep a resonance frequency of bubble 1 approximately or substantially equal to a central frequency of a signal transmitted by bubble 1, by controlling gas volume inside the bubble using solenoids and valves 8, 11. A phase difference between a signal from sensor 12 and a signal sent to control actuator 5 is used as an indicator of difference between the resonant frequency of bubble 1 and central frequency of emitted signal. Sensor 12 is coupled through an amplifier 16 to a phase comparator 17 having as its inputs the amplified signal from sensor 12 and the signal sent to control actuator 5 (or as shown to control electrical driver 13 to control actuator 5), and having as its out put a compared signal sent to processing circuit 14 for further processing as part of a phase feedback loop. Gas supply system 24 can be used to keep bubble 1 in resonance with an instantaneous frequency of a linear frequency modulated signal sweeping in a large frequency bandwidth for high precision bottom penetration profiling.

A spherical pressure gas-filled underwater bubble or balloon manufactured from an elastic material offers a large radiating area. The radius of the bubble and its surface area depend upon depth and frequency: for example, at a 1500 m depth, a 2 m radius bubble will have a resonant frequency of 20 Hz, and a bubble area of 50 square meters; for a frequency of 150 Hz, the radius will be 0.275 m and have an area about 0.95 square meter. For the sound source depth of 100 meters, a bubble with radius 1.1 meter and area 15 square meters will have 10 Hz frequency resonance, and a bubble with radius 0.11 meters and area only 0.15 square meter will have a resonance of 100 Hz. In one embodiment, the bubble can be less than or equal to about 2 meters radius and less than or equal to about 50 square meters area and greater than or equal to about 0.11 meter radius and greater than or equal to about 0.15 square meters area. In alternative embodiments, radii and surface areas may be greater than or less than these sizes. The bubble may function as a good impedance transformer, which increases the resistive component of the radiation impedance. The radiated impedance of the bubble projector, as reflected to the actuator or driver, is larger than for a direct radiator, which implies that the radiated power and the electro-acoustical efficiency are increased. The driver for the bubble projector may supply greater blocked pressure and reduced volume displacement than the direct emitter when both are operating at the same radiated power. To achieve high efficiency, a symmetrical air pump with open cylinders may be used having a closed central part between the cylinders, driven by an electrical motor controlled by a computer, and synchronized with digitally synthesized signal waveforms. When the air pump driver has just a closed central part (embodiment of FIG. 9A), the air pump has no resonance. This embodiment is suitable for use to sweep over a large band by changing exiting frequency and tuning the bubble by changing its dimensions. When the air pump is configured as in the embodiment of FIG. 9B, it will have resonance because the central part will have a form of Helmholtz resonator. The central part of the driver may have a form of Helmholtz resonator with its own resonant frequency. This embodiment is suitable for use to expand bandwidth in a case where the sound source may not by sweeping but may be using broadband signals with the central frequency in the middle of the frequency band of the sound source. The bubble resonant frequency and driver resonant frequency may be closely grouped to form a doubly resonant projector. This provision may yield transmitting bandwidth of ½ octave or greater.

Figure 2:
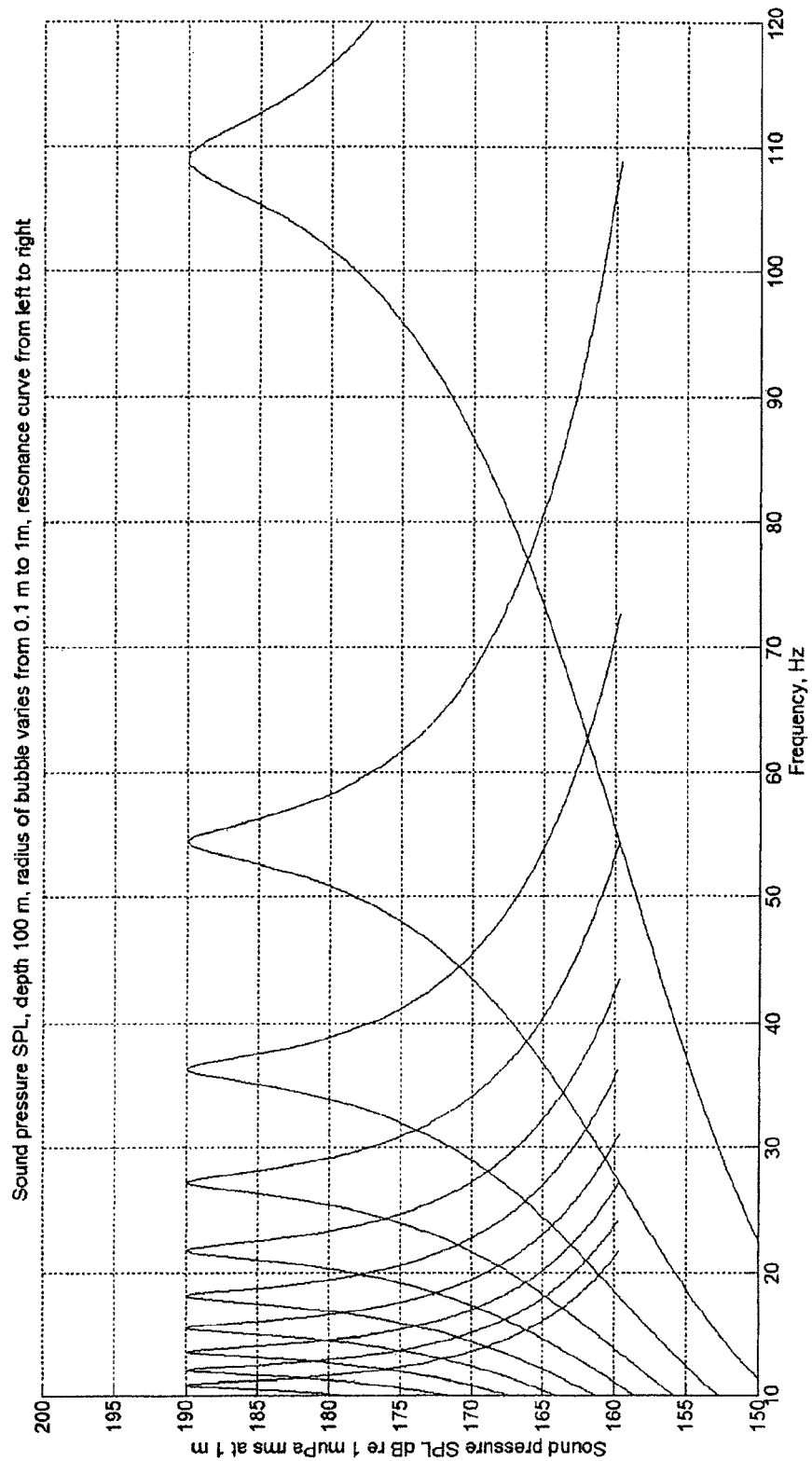
FIG. 2 is a graph depicting the sound pressure level (SPL) of a bubble source with radius varying from 0.1 m to 1 m at a depth of 100 meters, according to an exemplary embodiment.
Figure 3:
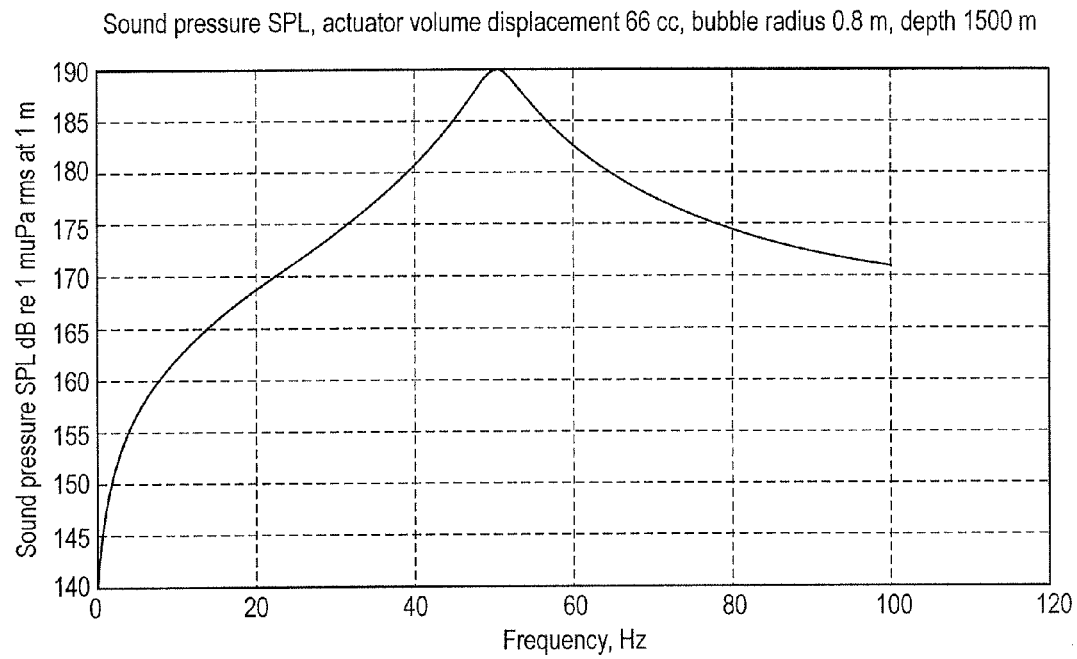
FIG. 3 is a graph depicting the sound pressure level (SPL) of a 50 Hz bubble source with radius 0.8 m and actuator volume displacement 67 cc at the depth 1500 meters, according to an exemplary embodiment.

Referring now to FIGS. 2 and 3, solutions of equations for sound pressure of a bubble source are shown, according to two exemplary embodiments. The pressure inside a bubble projector provided by a internal source of volume velocity can be described by known differential equations in the following form:

$$\frac{d^2 p}{dt^2} + \frac{\omega_r}{Q}\frac{dp}{dt} + \omega_r^2 = \frac{P_0}{V_0}\frac{dV_a}{dt} \quad (1)$$

$$\frac{\omega_r}{Q} = \frac{\gamma P_0 S_0}{V_0 \rho c} = \omega_r k_r a \quad (2)$$

where $\omega_r^2 = \frac{\gamma P_0 S_0}{V_0 \rho c}$ is the resonant frequency of a spherical bubble with a radius a, volume $V_0=(4/3)\pi a^3$, $S_0=4\pi a^2$ is the bubble surface area, and pressure $P_0$; $\gamma$ (1.4) is the ratio of the specific heats at constant pressure to specific heat at constant volume for gas within the bubble; $k_r=\omega_r/c$ is the resonance wave number; $Q=1/(k_r a)$ is the Q-factor. The solution of equation (1) is straight-forward for simulation and calculation of necessary volume velocity for an actuator. As shown in FIGS. 2 and 3, resonance frequent and inverted Q-factor are increasing proportionally with the square root of pressure or depth. The bandwidth of the bubble source can be potentially increased twice by adding additional resonance in the acoustical driver. Also, the resonance acoustical drive can be much more efficient.

FIG. 2 shows the sound pressure level (SPL) of a bubble source at depth 100 meters, as the radius of the bubbles varies from 0.1 m to 1 m. FIG. 2 shows how by changing bubble dimension, the resonant frequency can be swept. For example, in shallow water, the bubble resonator can become very high Q and low bandwidth, and to achieve a necessary bandwidth of 10-100 Hz, the resonant frequency can be swept simultaneously or along with the signal frequency of the control signal to keep the bubble in resonance with the control signal. FIG. 3 shows SPL of a 50 Hz bubble source with radius 0.8 m and actuator volume displacement 67 cc at the same depth of 1500 meters.

The necessary level of volume velocity displacement (16.7 cc for the first example of FIG. 2 and 66 cc for the second example of FIG. 3) at the frequencies lower than 150 Hz can be achieved by a standard symmetrical piston system, where pistons driven by an electrical motor are moving synchronically in opposite directions with an internal area between pistons sealed for air pressure. The electrical motor may be a rotary motor moving pistons with a crankshaft mechanism or a linear motor connected to pistons directly. The efficiency of such pumps may be as great as 30%. The brushless electrical motor (linear or rotary) with a computer controlled driver can reproduce a digitally synthesized signal.

The resonant frequency of a bubble resonator depends on internal pressure and on its volume and therefore may be controlled by pumping air from an external pressure tank into the bubble or releasing air from the bubble to change the dimensions of the bubble. The processing circuit 14 may be configured to change resonant frequency by pumping gas and expanding the bubble or by releasing gas and shrinking bubble, whereby one or more dimensions of the bubble are increased or decreased, respectively. To keep air-filled bubble 1 in resonance with a central frequency of a radiated signal and to keep the keep the phase of the radiated signal equal to the phase of the control signal, a microphone phased locked loop (PLL) can be applied (for example, as part of processing circuit 14). A phase difference between internal bubble pressure and a transmitted control signal sent on line 26 is an indicator of resonance. Processing circuit 14 is configured to keeping the phase difference close to zero in order to keep bubble resonator substantially in resonance with the signal emitted by bubble 1. In shallow water, when the Q-factor of the bubble resonator is very high and frequency bandwidth is too narrow for broadband signal transmission, the same PLL system can be configured to keep the bubble in resonance with the instantaneous frequency of a slowly changing frequency modulated signal. Such a system can be configured to sweep through a predetermined bandwidth, such as from 5 Hz to 100 Hz, and became a coherent replacement of widely used air-guns.

Figure 4:
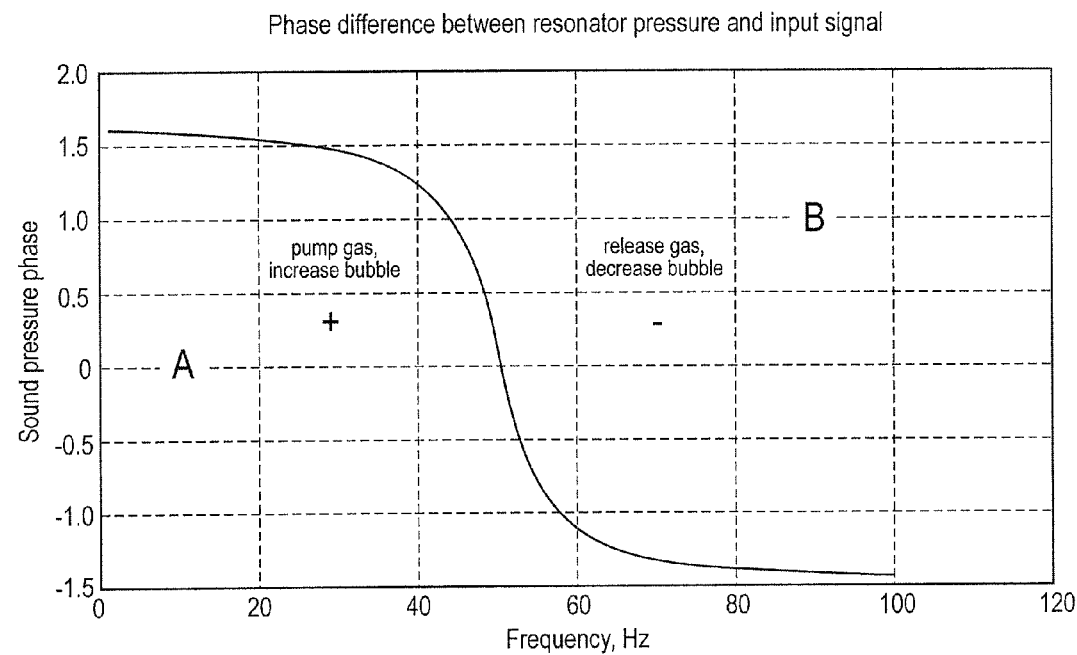
FIG. 4 is a graph depicting a difference of phase between a radiated signal and a control signal of the bubble resonator with radius 0.8 m at the depth 1500 meters, according to an exemplary embodiment.

FIG. 4 shows how phase difference between a control signal (input signal to actuator 5) and internal bubble pressure indicates the resonant frequency shift relative to the central signal frequency. The parameters of the bubble sound source are the same as in FIG. 3: resonant frequency is equal to 50 Hz, bubble has radius 0.8 m, actuator volume displacement is 67 cc and depth is the 1500 meters. The internal sound pressure is proportional to a signal received from internal microphone 12, FIG. 1. The phase of that signal can be compared by a phase comparator (part of processing circuit 14) with the phase of sound source input signal. If internal pressure phase is larger than input signal phase (region A), then the resonant frequency of the bubble is higher than the frequency of the emitted signal and processing circuit 14 is configured to control the system to pump air inside bubble and increase its radius to decrease resonant frequency. If the phase of the microphone signal is lower than the phase of input signal (region B), then the resonant frequency of the bubble should be increased by releasing gas outside and decreasing its radius. In this case, the sign (+/−) on the output of the signal comparator shows whether to pump or release gas from the pressure tank. Such control can be used for keeping a bubble in resonance with the central frequency of a deepwater sound source. The same system can run continuously with a linear frequency modulated signal keeping the bubble resonator in resonance with the instantaneous frequency of the radiated signal and keeping the phase of the radiated signal equal to the phase of the control signal. The last approach can greatly expand frequency bandwidth of a frequency swept signal and make it useful for air-gun replacement in the frequency band 5-100 Hz.

Figure 5:
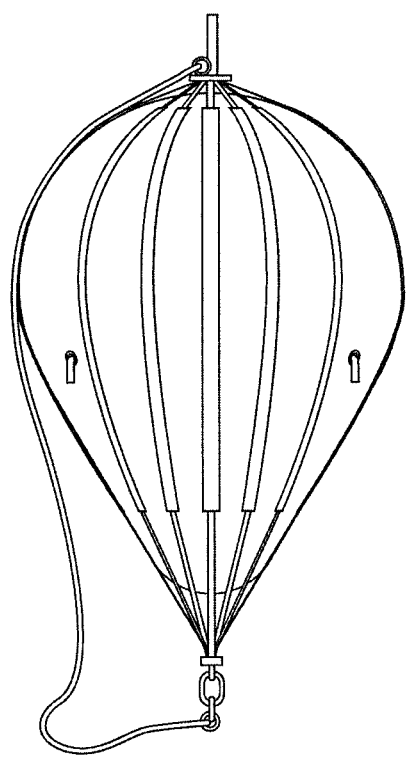
FIG. 5 is a picture of a lift bag suitable for use with the sound source of FIG. 1, according to an exemplary embodiment.

FIG. 5 shows a commercially available (or commercially off-the-shelf) air lift bag. Lift bags are available in very large diameters. For example, the lift bag depicted had more than a 1 meter radius which is suitable for a 20-30 Hz sound source. The bubble can be used as a flotation for a mooring design and can be filled with air continuously during deployment. High pressure air hoses for 1500 meters are also available and can be used to pump air from a ship's deck.

Figure 6:
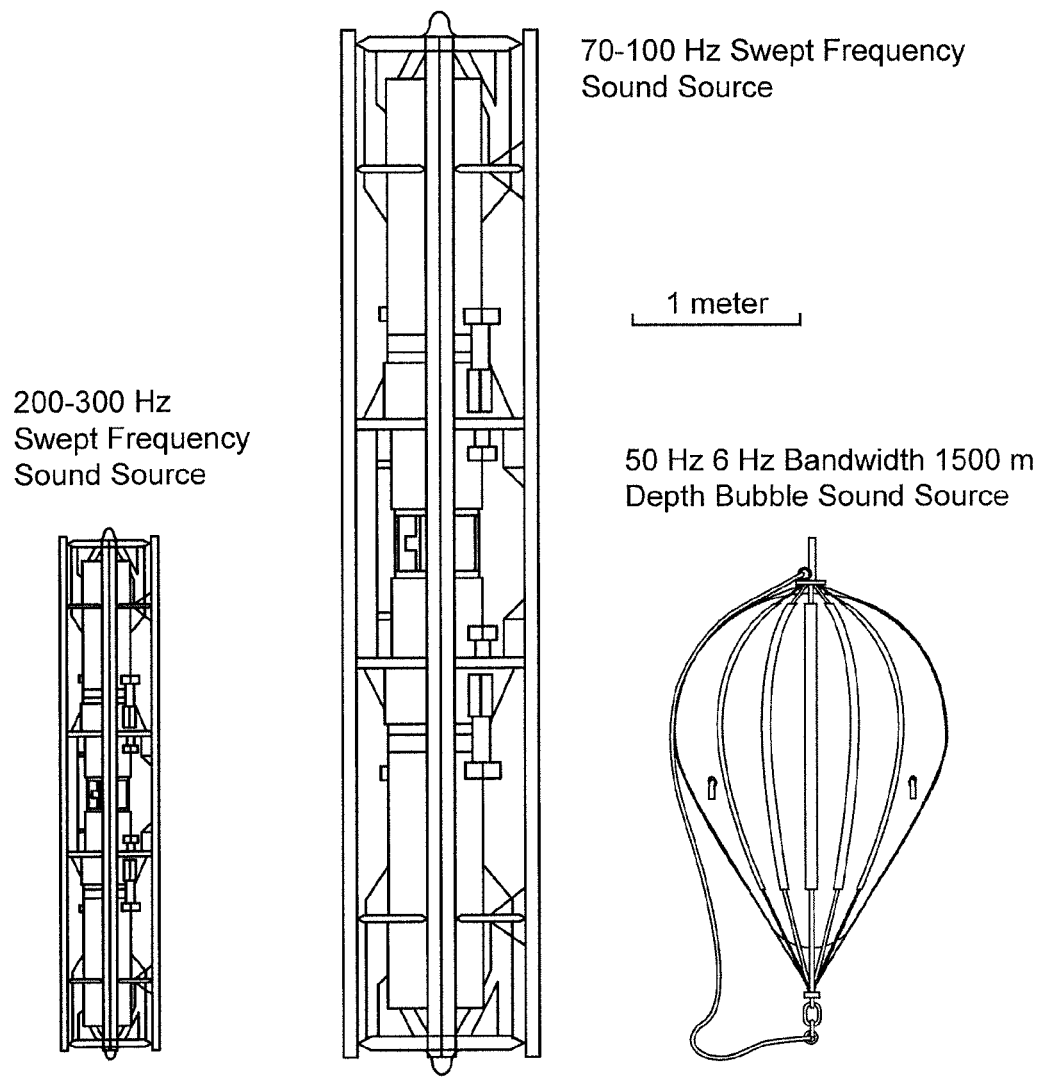
FIG. 6 is an illustration comparing exemplary sizes of low frequency sound sources to a size of an exemplary bubble sound source.

FIG. 6 is an illustration comparing exemplary sizes of low frequency organ-pipe sound sources to a size of an exemplary bubble sound source.

Figure 7:
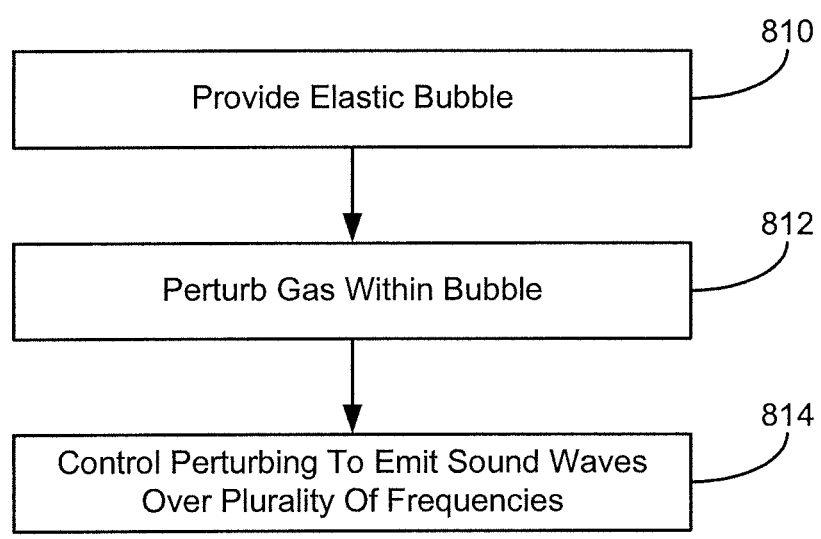
FIG. 7 is a flowchart of a method of generating underwater sound waves, according to an exemplary embodiment.

FIG. 7 is a flowchart of a method of producing sound, according to an exemplary embodiment. At a step 810, an elastic bubble filled with a gas is provided into an underwater environment. The environment may be a shallow or deep underwater environment, depending on the use. At a step 812, the gas within the bubble is perturbed in any of a variety of ways. At a step 814, the perturbing of the gas within the bubble is controlled to emit sound waves over a plurality of frequencies. The frequencies may be discrete frequencies or a linear sweep of frequencies over a range of frequencies (e.g., a chirp). The perturbing may be computer-controlled. As described above, the resonant frequency of the bubble may further be controlled with the computer or another computer by adjusting (increasing or decreasing) the volume or pressure of air within the bubble.

Figure 8A:
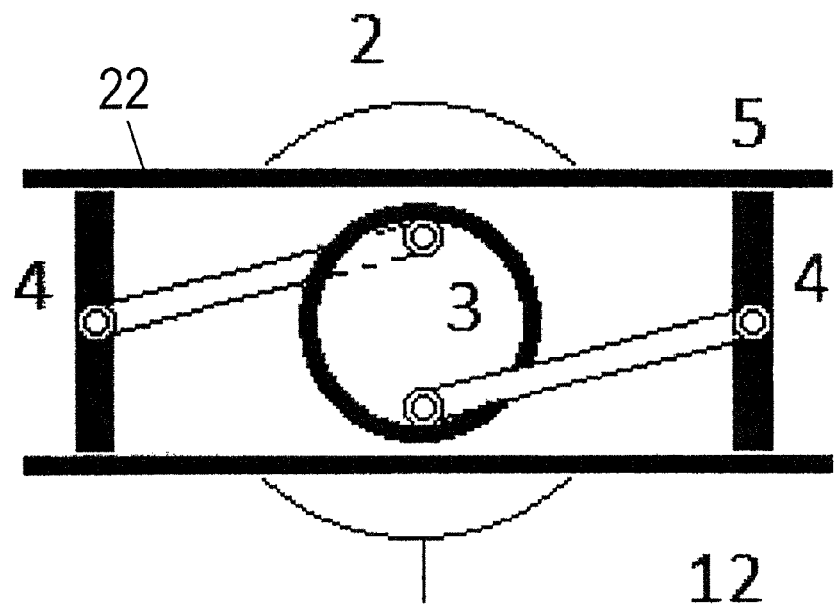
FIG. 8A is a diagram of an actuator, according to an exemplary embodiment.
Figure 8B:
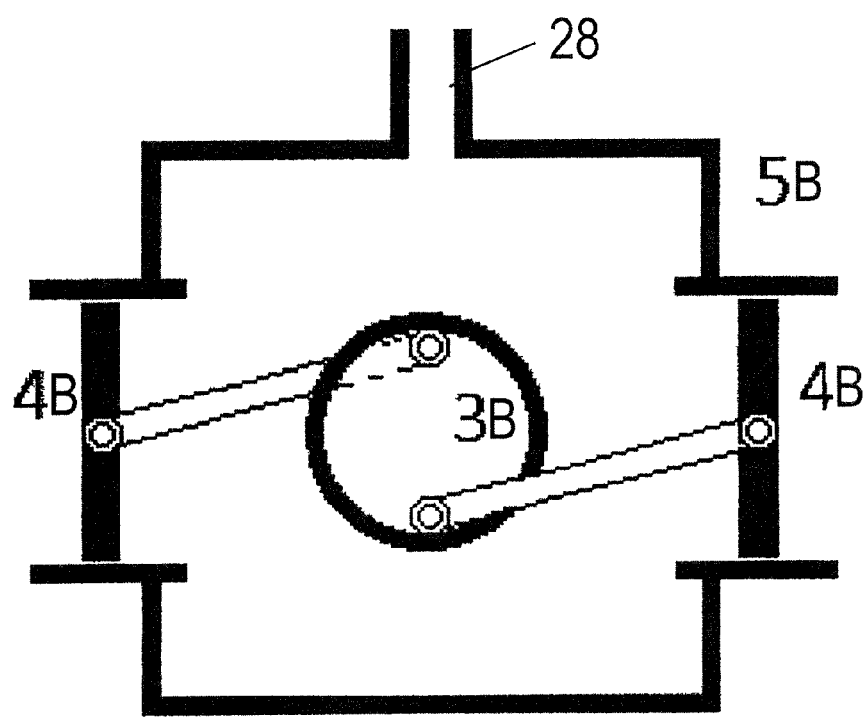
FIG. 8B is a diagram of an actuator, according to another exemplary embodiment.

The exemplary embodiments have been described herein with reference to a symmetrical air pump with opened cylinders, a closed central part between the cylinders an driven by an electric motor. Other actuators are contemplated. FIG. 8A shows the first embodiment of a symmetrical force-balanced mechanical actuator, which has a sealed cylinder 22 with two symmetrically moving pistons 4. This embodiment may be used in a system sweeping in a large frequency bandwidth, and may be used in a shallow water application. FIG. 8B shows a second embodiment of a symmetrical force-balanced mechanical actuator, which has a Helmholtz resonator camera (similar to known low-frequency subwoofers) with a narrow throat 28. Unlike the embodiment of FIG. 8A, the embodiment of FIG. 8B will have a resonant frequency in addition to the main bubble resonance. The bubble resonant frequency and driver resonant frequency may be closely grouped to form a doubly resonant projector. This provision yields a transmitting bandwidth of ½ octave or greater. The driver for the bubble projector may supply greater blocked pressure and reduced volume displacement than the direct emitter when both are operating at the same radiated power. The driver of FIG. 8B can be used as a deep-water variant to expand the bandwidth of the system.

Preferably, the actuator will be balanced for internal forces to keep the actuator from unexpected vibrations, in order to improve efficiency. Motor speed control may be done with any kind of modulation, such as phase modulation, frequency modulation, pulse code modulation (PCM), etc.

The bubble may be of a variety of different sizes. For example, the bubble may be at least 0.2 meters tall or in diameter or less than 4 meters tall or in diameter.

The sound source may be configured to emit sound of at least about 5 Hz, or less than about 150 Hz, or preferably between 10 Hz and 150 Hz or between 10 Hz and 100 Hz.

The sound source may be configured to provide a sound pressure level of greater than or equal to about 216 dB re 1 uPa/Hz @ 1 m.

The sound source may be configured to have an efficiency of at least about 10%, or less than about 30%.

The sound source may be configured to keep the bubble in a predetermined shape (e.g., sphere, fully inflated, etc.) under high water pressure at a depth of 1 kilometer or greater, or a depth of 1.5 kilometers or greater. A frequency control loop can be used for keeping pressure inside the bubble under necessary values.

Processing circuit 14 may comprise analog and/or digital circuit components, such as one or more microprocessors, microcontrollers, application-specific integrated circuits, interfaces, buses, A/D converters, etc. The circuit components may be configured or arranged to perform one or more of the functions or steps described herein, as well as other functions related to or needed to perform the functions or steps described herein. In one example, processing circuit 14 may comprise a non-transitory computer-readable storage medium, such as a memory, encoded with computer instructions that, when executed by a processor, perform the functions or steps described herein.

In other embodiments, a tunable resonant sound source with rigid and elastomeric portions may be used. The tunable resonator may be a tunable pipe resonator configured to include rigid, movable sleeves at both sides of the resonator. The tunable pipe and the movable sleeves may be cylindrical in shape. The sleeves may be connected to a mechanical linear actuator configured to move the sleeves to tune the control frequency of the resonator to the resonant frequency of the emitted sound waves and to keep the phase of the radiated signal equal to the phase of the control signal. The resonator may be configured to include inside the cylindrical portion a gas-filled bubble comprising an elastic material. An acoustical emitter, such as a volume velocity actuator, may be configured to perturb the gas within the bubble. The acoustical emitter may be disposed within the gas-filled bubble.

In some embodiments, the tunable resonator may include a cylindrical tunable pipe filled with gas and configured to include an internal coaxial pipe separating the internal volume of the resonator into two parts. The volumes may be configured to have at least one orifice between them. The orifice may be permeable to gas within the two volumes. A moving sleeve, which may be attached to an electrical motor actuator to enable sliding along the internal pipe, may cover the orifice between the volumes. An elastic membrane may be disposed on two sides of the cylindrical tunable pipe. One of the internal volumes may be separated from water by the elastic membrane. The other internal volume may be rigidly closed. An acoustical emitter, such as a volume velocity actuator, may be disposed between the two volumes. The acoustical emitter may be configured with two pistons symmetrically driven by an electrical motor. The tunable resonator may also include a processing circuit, including a microphone inside the gas bubble. The processing circuit may be configured to provide a control signal to the acoustical emitter and control signal to the actuator to cause the actuator to move the sleeves. Moving the sleeves may tune the resonator and keep it in resonance with the emitted sound waves over a plurality of frequencies.

Figure 9:
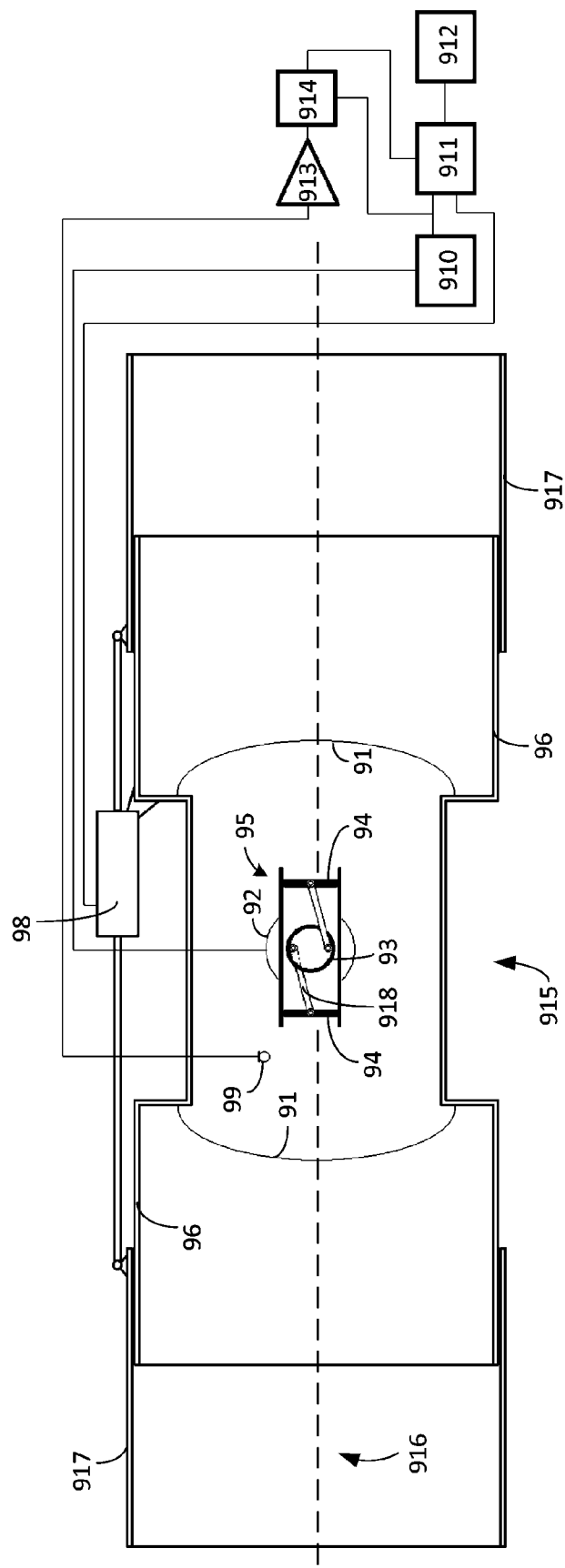
FIG. 9 is a block diagram showing a sound source and control system, according to an exemplary embodiment.

Referring to FIG. 9, a tunable pipe sound source or resonator 915 is shown. One or more of the elements of the embodiment of FIG. 9 may have similar structure and/or function as described with respect to corresponding elements in FIG. 1. The tunable pipe sound source 915 may include portions that are exposed to water. Sound source 915 may include rigid portions and elastomeric portions, both of which are exposed to water. Sound source 915 may include a rigid portion, such as a central tube 96, and an elastomeric portion, such as gas-filled bubble 91. In one embodiment, the tunable pipe sound source 915 may include a central tube 96 with rigid, movable coaxial sleeves 917. Central tube 96 may be a fixed rigid member, and sleeves 917 may be rigid movable members. In one embodiment, central tube 96 and coaxial sleeves 917 are cylindrical. In other embodiments, the central tube and coaxial sleeves may be different shapes. Central tube 96 may have an axis 916 through the center of the tube, along the length of the tube. Movable sleeves 917 may be disposed along the same axis 16 as central tube 96. In other embodiments, central tube 96 may have one or more axes, laying in different directions. Sleeves 917 may be moved laterally by linear electrical actuator 98, which may be controlled by microcontroller 911. In one embodiment, the sleeves may slide on wheels (not shown) along the internal pipe 96. Sound source 915 may include bubble 1 in the middle of central tube 96. Bubble 91 may be filled with a gas. The gas may be air, Nitrogen, or other gases.

Gas-filled bubble 91 may contain an acoustical driver 95 inside. In various embodiments, acoustical driver 95 may be a volume velocity actuator or a symmetrical pressure-balanced volume driver. Acoustical driver 95 may be configured with a plurality of symmetrically moving pistons 94, which are connected to crank 93 via rods 918. Crank 93 may be driven by electrical motor 92. In other embodiments, different types of motor, e.g., linear electrical motor, linear actuator, linear moving magnet actuator, variable reluctance motor, or linear voice coil actuator may be utilized. In other embodiments, pistons may be driven by mechanisms other than crankshaft mechanism. Two moving pistons 94 are provided in this embodiment, though three, four, or more pistons or other moving members may be used in alternative embodiments. Electrical motor 92 may be controlled by an electrical driver 910 and synchronized with a digitally synthesized signal waveform. At least a portion of the gas-filled bubble 91 may comprise an elastic material, which be non-transparent for gas under pressure. The tunable pipe sound source may be equipped with a microphone 99 inside air-filled bubble 91. Microphone 99 may be connected through amplifier 913 with phase comparator 914. The output of phase comparator 914 may be connected to an analog-digital converter (ADC) of microcontroller 911 with a precise clock 912. Precise clock 912 may be, e.g., a temperature-compensated crystal oscillator (TCXO) or a Rubidium or Cesium atomic clock.

To change the resonant frequency of the resonator, the length of resonant pipe may be increased or decreased by moving the two coaxial tubular sleeves 917 in opposite directions along the main pipe 96. In some embodiments, both main pipe 96 and sleeves 917 may be rigid. Main pipe 96 may be considered a first rigid portion, and sleeves 917 may be considered a second rigid portion. The movement of the second rigid portion relative to the first rigid portion may change the resonant frequency of the bubble. When cylindrical sleeves 917 slide outwardly and increase the length of resonator, the resonant frequency may decrease, as inverse square-root dependence, because of an increasing mass and inertia of water inside the sleeves. When cylindrical sleeves 917 slide inwardly and decrease the length of the resonator, the resonant frequency may increase, as inverse square-root dependence, because of a decreasing mass and inertia of water inside the sleeves. Extending the sleeves may be done as an alternative to changing the dimensions of bubble 91 to change resonant frequency. The movable sleeves 917 may be attached to one or more linear electric motor actuators 98, which control the position of the sleeves and ultimately the resonant frequency of the resonator. The gas-filled bubble 91 inside the resonator contains microphone 99 connected to a phase comparator 914. The phase comparator 914 may compare the phase from microphone 99 (i.e., the phase of the emitted sound waves) with the phase of a reference signal from microcontroller 911 (i.e., input signal driving acoustical driver 95). The microcontroller 911 of the system, which receives the output of the phase comparator 914, may compensate for the phase difference by moving the sleeves 917. Moving the sleeves 917 may keep the system in resonance with the instant frequency of the radiated signal.

The resonator may use a phase locked loop to track the phase of frequency swept signals. The sound source of FIG. 10 may transmit frequency swept signals with an arbitrary law of frequency change in a wide band. The frequency can change continuously with an arbitrary rate (frequency/time). The difference between frequencies of the signals may be arbitrary. The difference between frequencies during the sweep may be fixed or may vary. When frequency sweeping, the frequency response of propagation media (e.g., water) may be measured. It may be beneficial to sweep with a smaller rate of frequency change when frequency response is changing rapidly with frequency. The resonant frequency may be tuned from 100 Hz down to 5 Hz by extending and retracting the sleeves. The sound source of FIG. 10 may have a low resonant frequency (5 Hz and lower) and a high Q (up to 50), when working at depths smaller than 100 m.

The sound source of FIG. 9 may be a tunable high-Q resonator. The symmetrically moving pistons 94 driven by electrical motor 92 through a crankshaft mechanism may serve as one example of a powerful volume acoustic driver 95. The acoustic driver 95 may be limited in power only by the power of the electric motor 92 and can reach a maximum value of a hundred kW. The source of FIG. 9 may have the advantage of not changing the dimensions of the gas-filled bubble, and thus the buoyancy of the resonator, when changing resonant frequency. Such transducer may be stably towed by, e.g., a ship during frequency sweeping. Constraining the gas-filled bubble 1 inside resonator tube may make the design more rigid, which also makes the resonator suitable for towing. The frequency tuning mechanism may be quick, with an expected maximum rate of frequency change of 30-50 Hz/sec.

The sound source of FIG. 9 may have 1-2 dB directivity gain in the downward direction and may have practically no wall vibrations. All forces in the sound source may balance each other and potentially will have a much higher efficiency than a non-symmetrical variant. The cylindrical form of the seismic transducer and small weight of the sound source may increase overall towing stability. The bubble source is less likely to be damaged by cavitation. A gas-filled filled bubble oscillating in water is less likely to blow apart or split the water, and make vacuum cavities that cause cavitation damage. To sweep over a large frequency band, the high-Q resonator may be tuned by moving coaxial sleeves symmetrically and enlarging the length of the resonator.

Figure 10A:
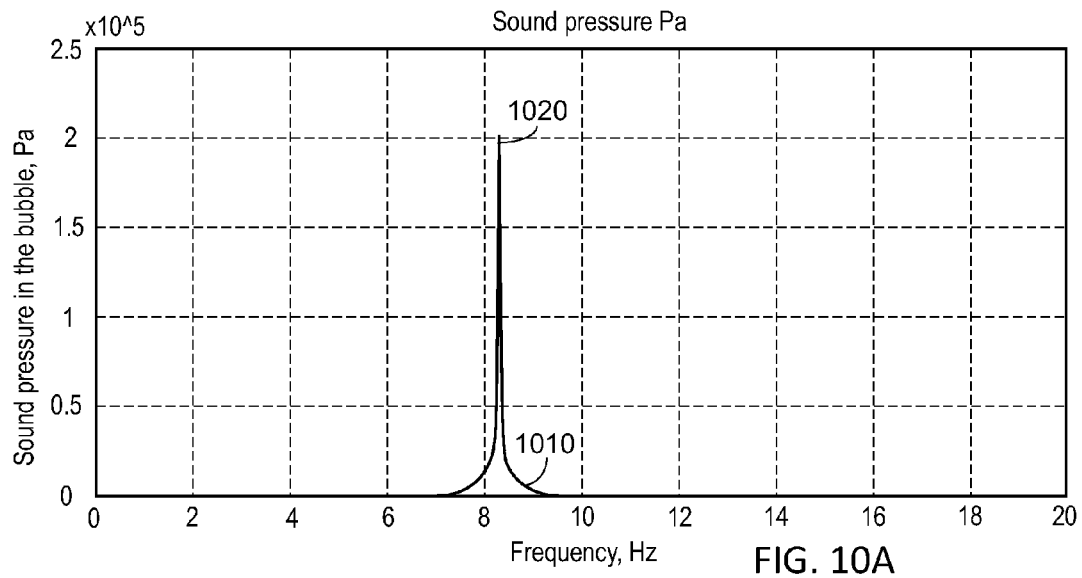
FIG. 10A is graph depicting the sound pressure of the sound source of FIG. 9.

The resonant frequency of the gas-filled bubble sound source may be controlled. The resonant frequency and phase of the radiated signal may be kept equal to the frequency and the phase of the control signal by comparing the phase between an electrical signal from the internal microphone 99 (FIG. 9) and the control signal. The internal sound pressure of the sound source may be proportional to the signal from the microphone 99. FIG. 10A contains a plot of the frequency of the signal from the microphone compared to the sound pressure inside the bubble. FIG. 10A depicts the sound pressure for a sound source with a resonant frequency around 8.25 Hz. Curve 1010 may be the sound pressure for control signals varying from around 1 Hz to around 15 Hz. Curve 1010 may have a peak 1020. Peak 1020 may occur when the frequency and phase of the control signal are equal to the resonant frequency and phase of the sound source (i.e., around 8.25 Hz). The sound pressure of the sound source may be greatest, if only the control frequency is varied, when the control signal equals the resonant frequency of the sound source.

Figure 10B:
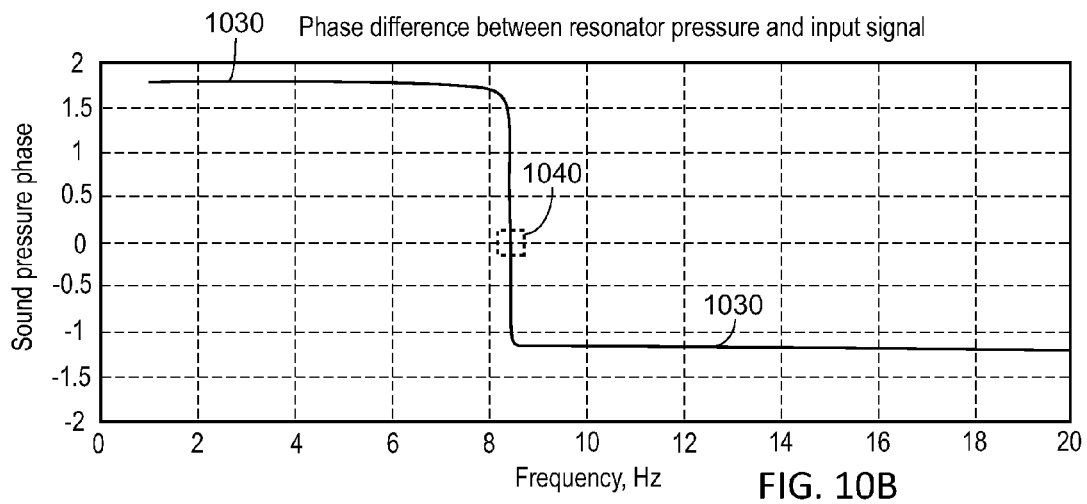
FIG. 10B is a graph depicting the difference of phase between a radiated signal and a control signal of the sound source of FIG. 9, according to an exemplary embodiment.

The phase of the microphone signal can be compared by the phase comparator 914 with the phase of the sound source input signal from microcontroller 911 (FIG. 9). FIG. 10B contains a plot of the phase difference between the radiated signal and the control signal (i.e., the input signal to acoustical driver 95 of FIG. 9) as a function of the frequency of the control signal. The plot of FIG. 10B may correspond to a sound source with a resonant frequency around 8.25 Hz. Curve 1030 may be positive (as it is on the left side of FIG. 10B) if the phase of the radiated signal of the sound source (i.e., the phase of the microphone signal) is greater than the phase of the control signal. If the microphone phase is larger than the control signal phase, then the resonant frequency of the resonator is higher than the frequency of the signal. To decrease the resonant frequency, sleeves 917 (FIG. 9) may be moved to extend the length of the transducer. Curve 1030 may be negative (as it is on the right side of FIG. 10B) if the phase of the radiated signal of the sound source (i.e., the phase of the microphone signal) is less than the phase of the control signal. If the phase of the microphone signal is lower than the phase of the input signal, then the resonant frequency of the transducer should be increased by moving the sleeves to the center and decreasing the transducer length. Curve 1030 may reach a resonance point 1040 when the phase of the sound source is equal to the phase of the control signal. Resonance point 1040 may occur when the frequency of the control signal equals the resonant frequency of the sound source (i.e., the phase difference is zero). In FIG. 10B, the resonant frequency of the sound source may be around 8.25 Hz. The sign of the phase difference is different before and after resonance. The sign of the output of the signal comparator may show how to move the sleeves. If the output is positive, the sleeves may be moved outwardly (i.e., extend sleeves) to reach resonance. If the output is negative, the sleeves may be moved inwardly (i.e., move sleeves towards central part of tube) to reach resonance.

Phase locked loop (PLL) may allow for the tunable source to be kept in resonance with instant frequency of the control signal and for the phase of the radiated signal to be kept equal to the phase of the control signal. This control may be used for keeping the resonator in resonance with the frequency of emitted waves from the sound source. The same system can run continuously with the linear frequency modulated signal (or any other given frequency modulation law), keeping the bubble resonator in resonance with the instant frequency of the radiated signal and keeping the phase of the radiated signal equal to the phase of the control signal. The proposed approach can substantially expand the frequency bandwidth of the frequency swept signal and make it useful for air-gun replacement in the frequency band of at least about 5 Hz to about 100 Hz or less, or other frequencies.

Figure 11:
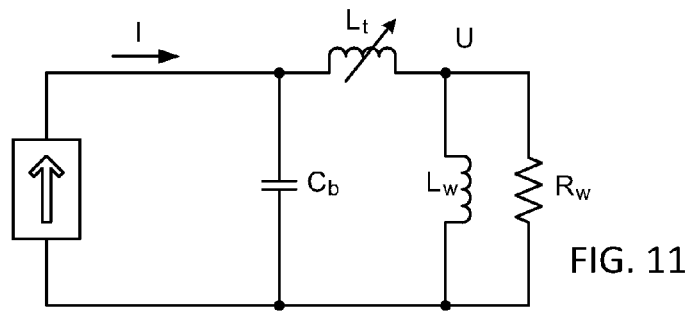
FIG. 11 is a diagram of an electrical circuit that may be used to simulate the sound source of FIG. 9, according to an exemplary embodiment.

FIG. 11 is an electrical circuit that may simulate the tunable resonator of FIG. 9. Mathematical models of the acoustic properties of a bubble sound source allow for prediction and determination of the main parameters of the bubble sound source. The standard electrical circuit model of acoustical structures suggests an equivalence of sound pressure P to the electrical voltage V and volume velocity $V_v$ to the electrical current I. In that case, compliance of the medium (e.g., water) will correspond to an electrical capacitor with capacitance C, and inertia of water mass corresponds to the electrical inductor with the inductance L. Equations may be derived to precisely show the rigorous logic of the physical acoustics of an underwater gas filled bubble.

Values for the radiation resistor $R_w$ and attached water inductance $L_w$ are:

$$R_w = \frac{\rho c}{A_b}; \quad (1)$$

$$L_w = \frac{\rho a}{A_b} = R_w \frac{a}{c}, \quad (2)$$

where $A_b = 4\pi a^2$ is the bubble surface area, a is the bubble radius, $\rho$ is the water density, and c is the sound velocity. Compliance (capacity) of the bubble has the form for gas compressibility:

$$C_b = \frac{V_b}{P_b \gamma}, \quad (3)$$

where $\gamma = 1.4$, the ratio of the specific heat at constant pressure to the specific heat at constant volume for the gas within the bubble; $P_b$ is the pressure of the gas inside the bubble; and $$V_b = \frac{4}{3}\pi a^3$$

is the bubble volume. The tunable variable inductance of water inertia inside the sleeve $L_t$ is:

$$L_t = \frac{\rho l}{A_t} \quad (4)$$

where l is the length of the throat of the resonator (length of extended sleeve), and $A_t$ is the area of the sleeve.

The frequency transfer function for the tunable resonator with the bubble transducer has the form $$V_v(t) = \frac{i\omega L_t I}{\left[1 + i\omega\left(\frac{L_w}{R_w}\right) + (i\omega)^2 C_b(L_t + L_w) + (i\omega)^3 \frac{C_b L_t L_w}{R_w}\right]}, \quad (5)$$

where $L_t = \frac{\rho l}{A_t}$ is the tunable variable inductance of water inertia inside the sleeve; l is the length of the throat of the resonator (length of extended sleeve); $A_t$ is the area of the sleeve;

$$R_w = \frac{\rho c}{A_a}$$

is the radiation resistor, where $A_a$ is the area of aperture, ρ is the water density, and c is the sound velocity;

$$L_w = R_w \frac{a}{c}$$

is the water inertia, where a is the radius of the resonator; and $$C_b = \frac{V_b}{P_b \gamma}$$

is the compliance of the gas within bubble volume $V_b$, $P_b$ is the pressure of the bubble gas, and γ=1.4, the ratio of the specific heat at constant pressure to the specific heat at constant volume for gas within the bubble.

Figure 12:
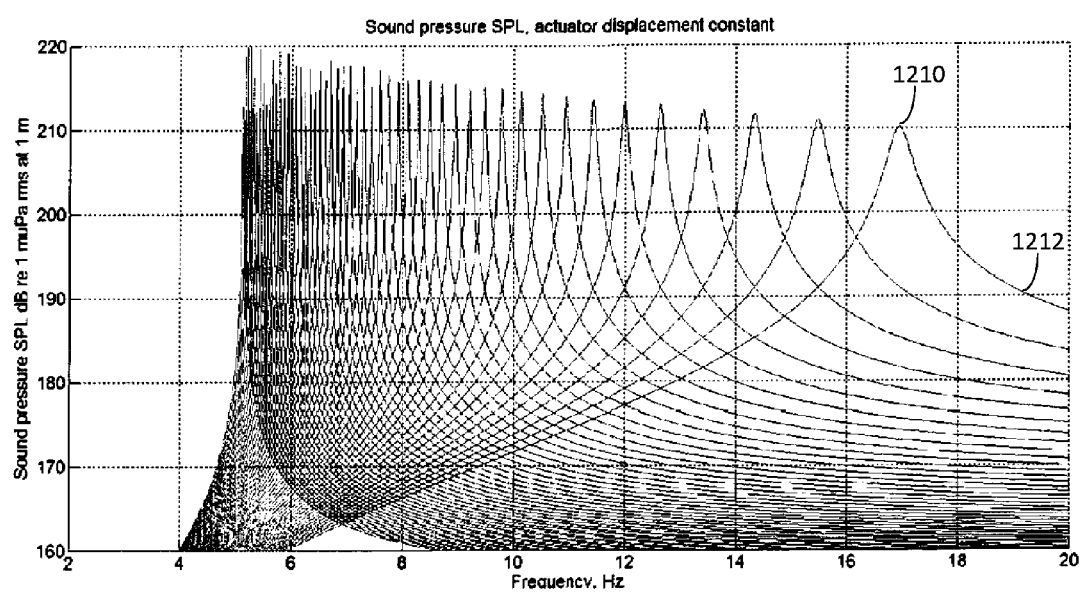
FIG. 12 is a graph depicting simulated sound pressure levels of the sound source of FIG. 9, with sleeve displacements varying from 0.01 m to 0.5 m, using the model electrical circuit of FIG. 11, according to an exemplary embodiment.

The derived equations give the volume displacement of the acoustic driver and displacement of the stroke of the driving mechanism. From the bubble pressure, the force can be calculated as well. The model gives the parameters of the acoustic driver and allows for the prediction of the sound pressure for the design. The results of the simulated sound pressure of the tunable projector are shown in the FIG. 12. FIG. 12 shows the variety of different resonance curves for sound pressure level (SPL) corresponding to different displacements of sleeves changing in the range from 0.01 m to 0.5 m. Resonance curve 1212 corresponds to a control signal frequency around 17 Hz. Curve 1212 illustrates the variation in sound pressure of sound source 915 (FIG. 9) depending on the displacement of sleeves 917. When sound source 915 reaches resonance with the control signal around 17 Hz, curve 1212 experiences peak 1210. Peak 1210 corresponds to a position of sleeves 917 that achieves resonant frequency. Peak 1210 may correspond to a maximum sound pressure of sound source 915, when only displacement of sleeves 917 is varied. The parameters of the simulation are:

Sea depth: 30 m;
Diameter of internal resonator: 0.5 m;
Diameter of aperture: 1.25 m;
Length of air filled cylinder: 2.0 m;
Length of sleeves: 0.01 m-0.5 m.

Figure 13A:
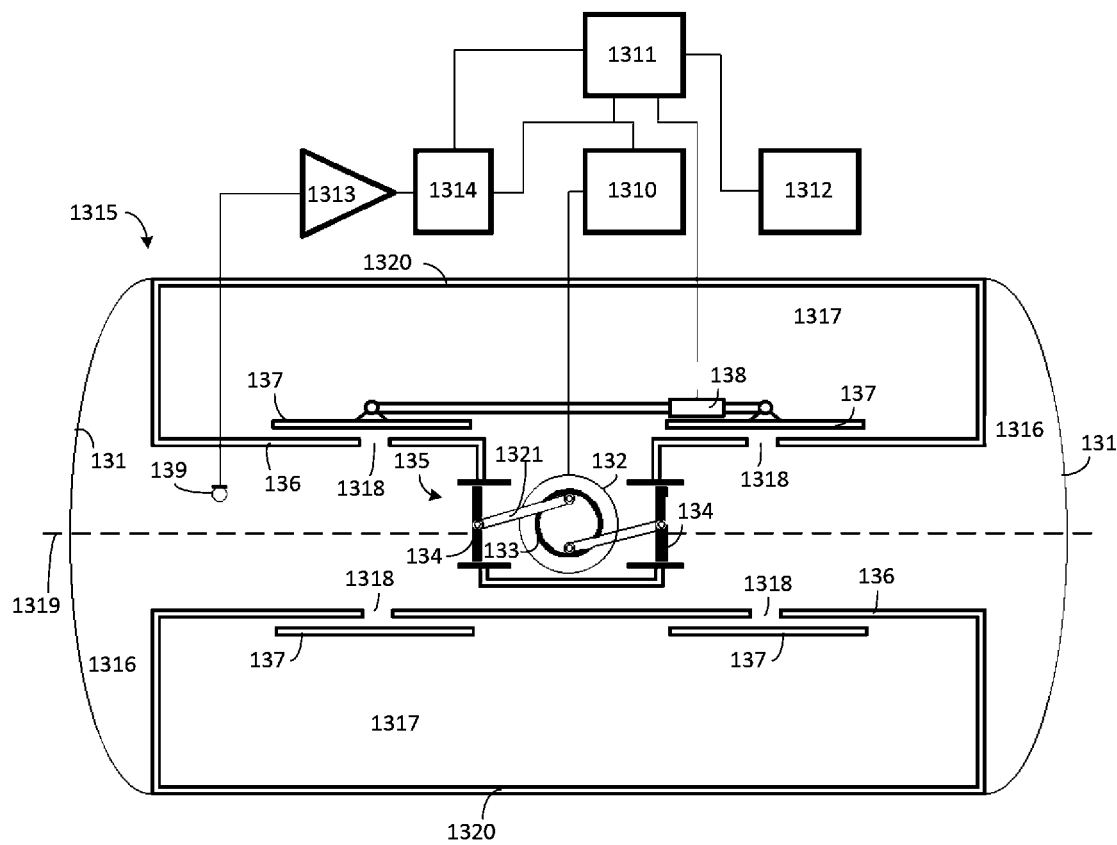
FIG. 13A is a block diagram showing a sound source and control system, according to an exemplary embodiment.

Referring to FIG. 13A, a gas-filled tubular resonator and tunable pipe sound source 1315 is shown, according to another embodiment. One or more of the elements of the embodiment of FIG. 13A may have similar structure and/or function as described with respect to corresponding elements in FIG. 1. Sound source 1315 may be considered a tubular resonator. Sound source 1315 may include exterior portions that are exposed to water. The exterior of sound source 1315 may include rigid portions and elastomeric portions, both of which may be exposed to water. The exterior of sound source 1315 may include rigid portion, such as an outer wall 1320, and an elastomeric portion, such as rubber boots or membranes 131 on both sides. In other embodiments, different portions of the exterior may be rigid and elastomeric. Sound source 1315 may be filled with a gas. The interior of sound source 1315 includes tunable central pipe 136. Central pipe 136 may be variously referred to as main tube/pipe, central tube/pipe, internal tube/pipe, or tubular wall. In one embodiment, central pipe 136 may be tubular or cylindrical. Other shapes may be used in other embodiments. Resonator 1315 may include a tunable mechanism inside rubber boots or membranes 131. Rubber boots or membranes 131 may comprise an elastic material, which be non-transparent for gas under pressure. Resonator 1315 may be configured to include, inside, a coaxial central pipe 136 separating the internal volume into two parts, first volume 1316 and second volume 1317. First volume 1316 and second volume 1317 may be filled with gas. The gas may be air, Nitrogen, or other gases. Central tube 136 may be configured to have at least one orifice or opening 1318 between it and moving sleeves 137. Central tube 136 may be considered a rigid tubular wall. Orifices 1318 may allow for the flow of gas between first volume 1316 and second volume 1317. Central tube 136 may have an axis 1319 through the center of the tube, along the length of the tube. Movable sleeves 137 may be disposed along the same axis 1319 as central tube 136. In one embodiment, sound source 1315 may include two movable sleeves disposed symmetrically along central tube 136. In other embodiments, central tube 135 may have one or more axes, laying in different directions. Moving sleeves 137 may be attached to the electrical motor actuator 138, which may enable the sleeves to move laterally along the internal pipe 136. Sleeves 137 may be moved symmetrically. In one embodiment, sleeves 137 may slide on wheels along the internal pipe 136. In one embodiment, sleeves 137 may be cylindrical. Other shapes may be used in other embodiments. Movable sleeves 137 may be considered rigid tubular members. In some embodiments, both main pipe 136 and sleeves 137 may be rigid. Main pip 136 may be considered a first rigid portion, sleeves 137 may be considered a second rigid portion. The movement of sleeves 137 relative to orifices 1318 of central tube 136 may change the resonant frequency of the bubble. In one embodiment, both first volume 1316 and second volume 1317 may be filled with a gas, and elastic membrane 131 and outer wall 1320 may be in contact with water.

Resonator 15 may include an acoustical driver 135 in a wall between the two internal volumes. In some embodiments, acoustical driver 135 may be a symmetrical pressure-balanced volume driver or volume velocity actuator. Acoustical driver 135 may be configured with a plurality of symmetrically moving pistons 134, which are connected to crank 133 via rods 1321. Crank 133 may be driven by electrical motor 132. In other embodiments, different types of motor, e.g., linear electrical motor, linear actuator, linear moving magnet actuator, variable reluctance motor, or linear voice coil actuator may be utilized. In other embodiments, pistons may be driven by mechanisms other than crankshaft mechanism. Two moving pistons are provided in this embodiment, though three, four, or more pistons or other moving members may be used in alternative embodiments. Electrical motor 132 may be controlled by an electrical driver 1310 and synchronized with a digitally synthesized signal waveform. The resonator 1315 may be equipped with the microphone 139 inside first volume 1316. In various embodiments, the microphone may be placed in different locations inside resonator 1315. Microphone 139 may be connected through amplifier 1313 with phase comparator 1314. The output of phase comparator 1314 may be connected to an analog-digital converter (ADC) of microcontroller 1311 with a precise clock 1312. Precise clock 1312 may be, e.g., a temperature-compensated crystal oscillator (TCXO) or a Rubidium or Cesium atomic clock.

The mechanism for tuning the resonant frequency of resonator 1315 may depend on the inertia of the gas in the path of gas flow between first volume 1316 and second volume 1317. A gas flow path between the two volumes may be created by orifices 1318. The gas flow path includes the gap between sleeves 137 and internal cylinder 136, and the area of orifices 1318. The volume and pressure of gas in the two volumes may change during each half period of acoustical driver 135. During the first half of the frequency period, pistons 134 (of acoustical driver 135) are moving from second volume 1317 to first volume 1316. As a result, the pressure inside first volume 1316 may rise, and gas may flow from first volume 1316 to second volume 1317. During the second half period, pistons 134 move from first volume 1316 to second volume 1317. As a result, the pressure inside second volume 1317 may rise, and gas may flow back from second volume 1317 to first volume 1316. The rate (speed) of the gas flow determines the rate of the resulting pressure change in both volumes and, consequently, the resonant frequency of the system. Increasing the rate of gas flow will increase the resonant frequency of resonator 1315; decreasing the rate will decrease the resonant frequency. The rate of gas flow may depend on the inertia of the gas in the path between the two volumes. The inertia of the gas may be adjusted by changing the area and length of the gas flow path. Length and area are dimensions of the gas flow path and depend on the position of sleeves 137. The inertia of the gas is directly proportional to the length of the path and inversely proportional to the area of the path. Moving sleeves 137 outwardly (relative to acoustical driver 135) decreases the length and increases the area of the gas flow path. Thus, moving the sleeves outwardly may decrease the inertia of the gas and increase the resonant frequency of resonator 1315. Moving sleeves 137 inwardly (relative to acoustical driver 135) increases the length and decreases the area of the gas flow path. Thus, moving the sleeves inwardly increases the inertia of the gas and decreases the resonant frequency. This tuning mechanism may allow for control of the resonant frequency from inside the bubble without the exposure of moving parts to the outside (e.g., water).

Resonator 1315 contains microphone 139 connected to a phase comparator 1314. The phase comparator 1314 compares the phase from the microphone 139 (i.e., the phase of the emitted sound waves) with the phase of a reference signal from microcontroller 1311. The microcontroller 1311 of the system, which receives the output of the phase comparator 1314, may compensate for the phase difference by moving the sleeves 137. Moving the sleeves 137 may keep the system in resonance with the instant frequency of the transmitted signal. The resonator can use a phase locked loop to track phase of frequency swept signals. The operation of microphone 139 and phase comparator 1314 to tune the resonant frequency is similar to the operation described in the discussion of FIGS. 10A-10B, above. The sound source of FIG. 13A may transmit frequency swept signals with the arbitrary law of frequency change in a very wide band. The resonant frequency may be tuned from 100 Hz down to 5 Hz by extending and retracting the sleeves. The sound source of FIG. 13A may allow for the frequency band covered by a resonator to be enlarged by tuning a narrow-band resonator over a large range of frequencies.

The sound source of FIG. 13A may have no moving parts outside of the housing or in contact with the surrounding water. This may allow for the use of lighter sleeves and decreased inertia (faster reaction) of the tuning mechanics. This may result in the ability for quicker frequency change. The tuning actuator will work inside the gas chamber and may be more reliable. The sound source operates with a larger radiation aperture and can be more powerful than other designs. The resonant frequency may also be tuned without changing the dimensions of the bubble and its buoyancy, which may allow for stable towing by, e.g., a ship during frequency sweeping.

FIGS. 13B-13F are alternate embodiments of sound source 1315 of FIG. 13A. One or more of the elements of the embodiments in FIGS. 13B-13F may have similar structure and/or function as described with respect to corresponding elements in FIG. 13A. FIGS. 13B-13F may not show all of the elements of FIG. 13A, and FIG. 13A may not show all of the elements of FIGS. 13B-13F.

Figure 13B:
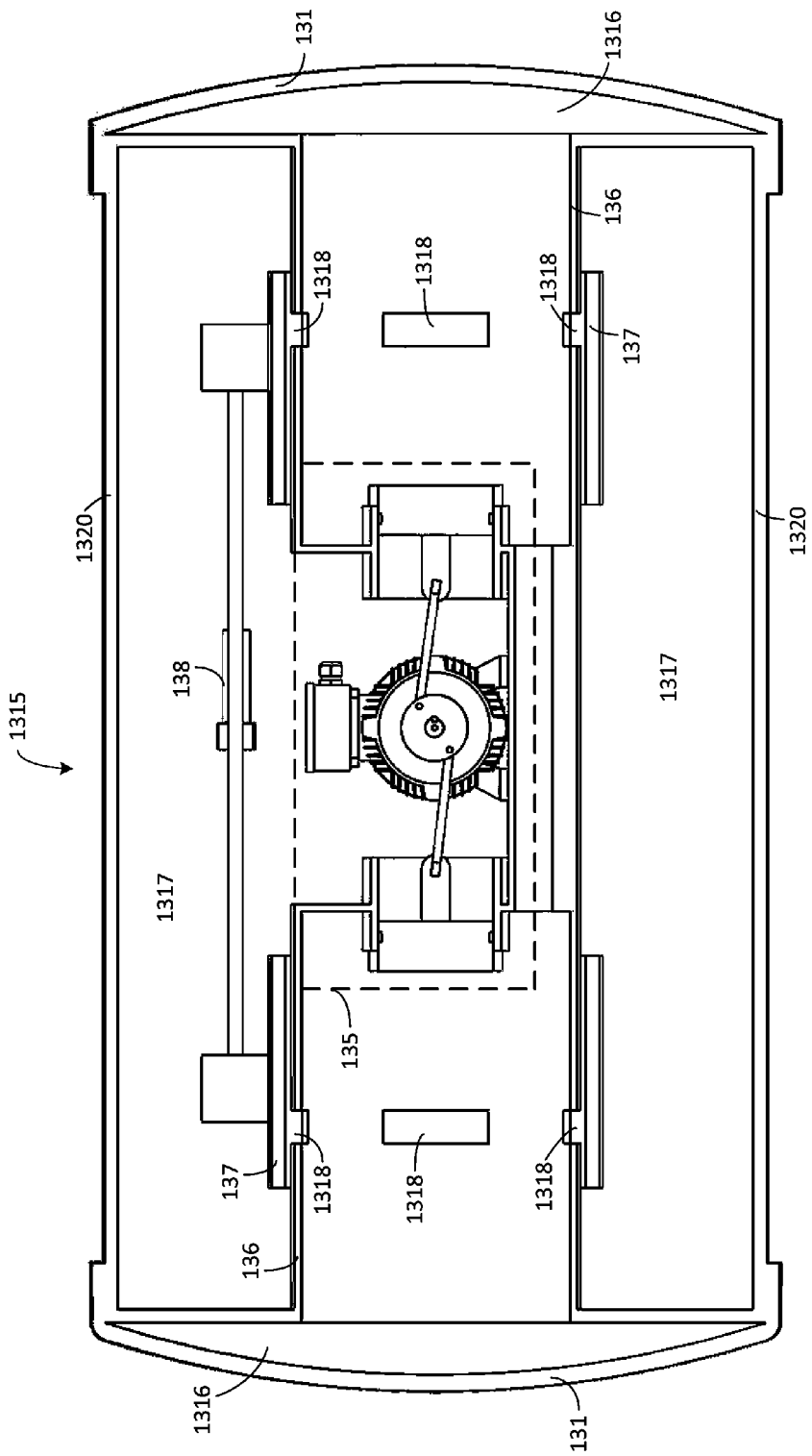
FIGS. 13B-F are alternate views of the sound source of FIG. 13A, according to exemplary embodiments.

Referring to FIG. 13B, a cross-sectional view of sound source 1315 is shown, according to an exemplary embodiment. Sound source 1315 includes rubber boots or membranes 131. Rubber boots or membranes 131 may be an elastomeric portion of sound source 1315. Sound source 1315 also includes outer wall 1320. Outer wall 1320 may be a rigid portion of sound source 1315. Sound source 1315 is also shown to include central tube 136. Central tube 136 may be considered a rigid tubular wall. Central tube 136 may divide the volume inside sound source 1315 into first volume 1316 and second volume 1317. Central tube 136 includes a plurality of orifices 1318. Orifices 1318 may allow for the flow of gas between first volume 1316 and second volume 1317. Orifices 1318 may be covered and uncovered depending on the position of sleeves 137. Sleeves 137 may be a moveable. Sleeves 137 may be a rigid tubular member of sound source 1315. Sleeves 137 may be moved by actuator 138. Acoustical driver 135 is shown to be disposed within sound source 1315.

Figure 13C:
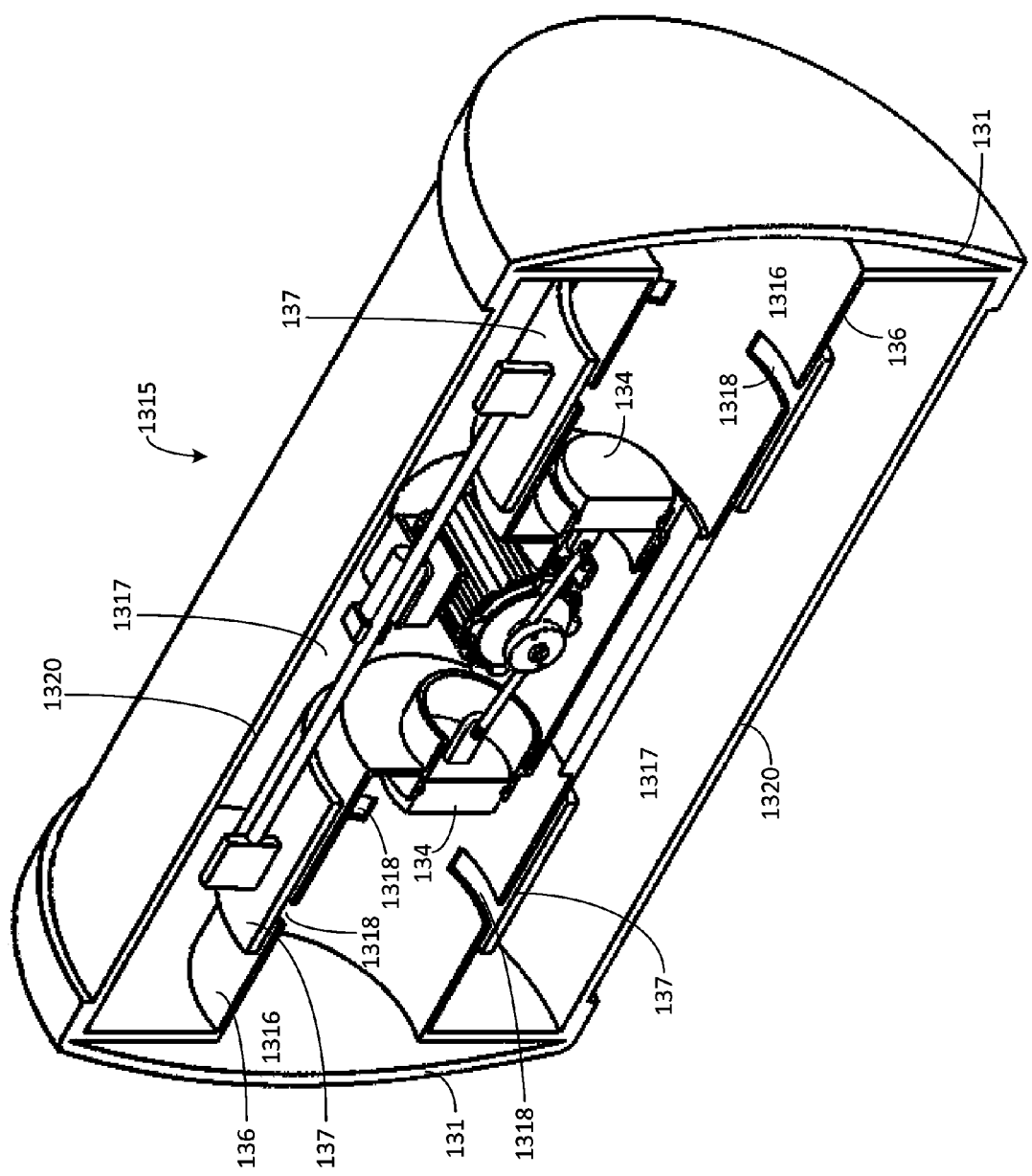

Referring to FIG. 13C, a cross-sectional view of sound source 1315 is shown from an elevated angle, according to an exemplary embodiment. Sound source 1315 includes rubber boots or membranes 131. Rubber boots or membranes 131 may be an elastomeric portion of sound source 1315. Sound source 1315 also includes outer wall 1320. Outer wall 1320 may be a rigid portion of sound source 1315. Sound source 1315 is also shown to include central tube 136. Central tube 136 may divide the volume inside sound source 1315 into first volume 1316 and second volume 1317. Central tube 136 includes a plurality of orifices 1318. Orifices 1318 may allow for the flow of gas between first volume 1316 and second volume 1317. Orifices 1318 may be covered and uncovered depending on the position of sleeves 137. Sleeves 137 may be a rigid, moveable member of sound source 1315. Pistons 134, which form part of the acoustical driver, is shown to be disposed within sound source 1315. In the embodiment of FIG. 13C, sound source 1315, central tube 136, and sleeves 137 are cylindrical in shape. In other embodiments, sound source 1315, central tube 136, and sleeves 137 may be different shapes.

Figure 13D:
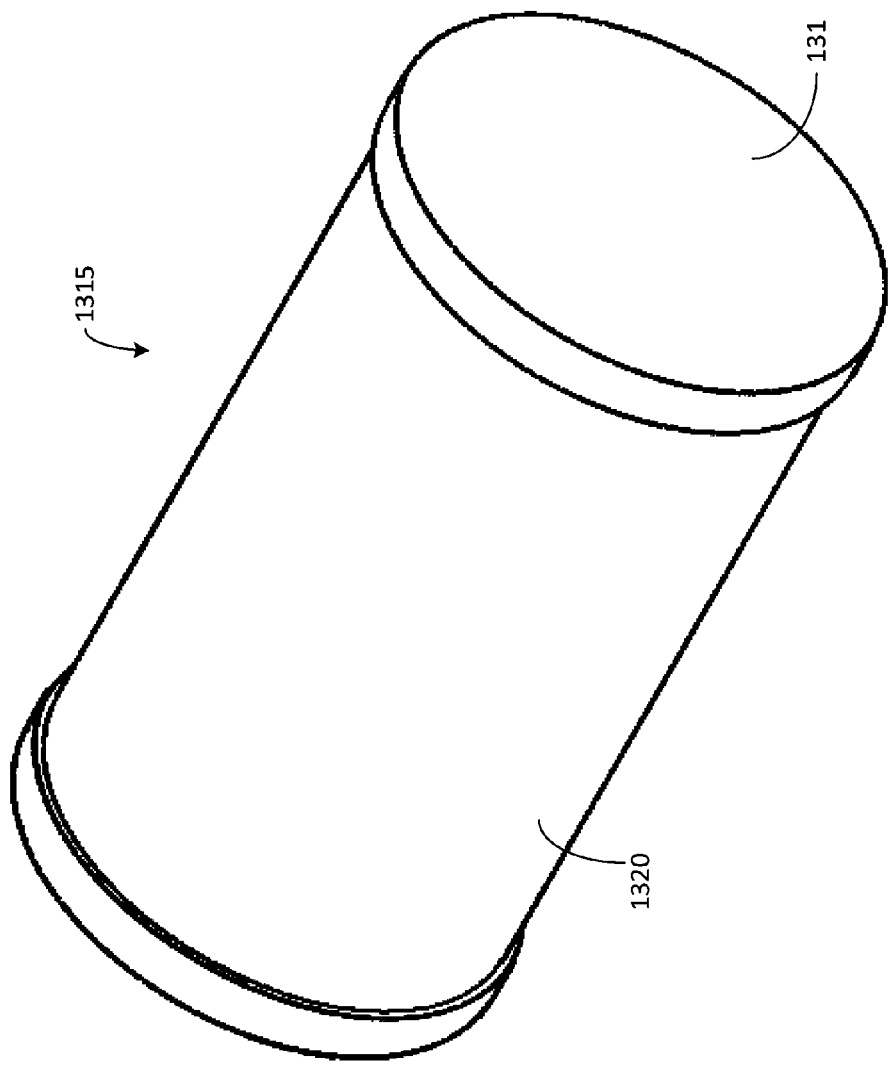

Referring to FIG. 13D, the exterior of sound source 1315 is shown from an elevated angle, according to an exemplary embodiment. Sound source 1315 includes rubber boots or membranes 131. Rubber boots or membranes 131 may be an elastomeric portion of sound source 1315. Sound source 1315 also includes outer wall 1320. Outer wall 1320 may be a rigid portion of sound source 1315. Sound source 1315 is shown to be cylindrically-shaped in the embodiment of FIG. 13D. In other embodiments, sound source 1315 may take other shapes.

Figure 13E:
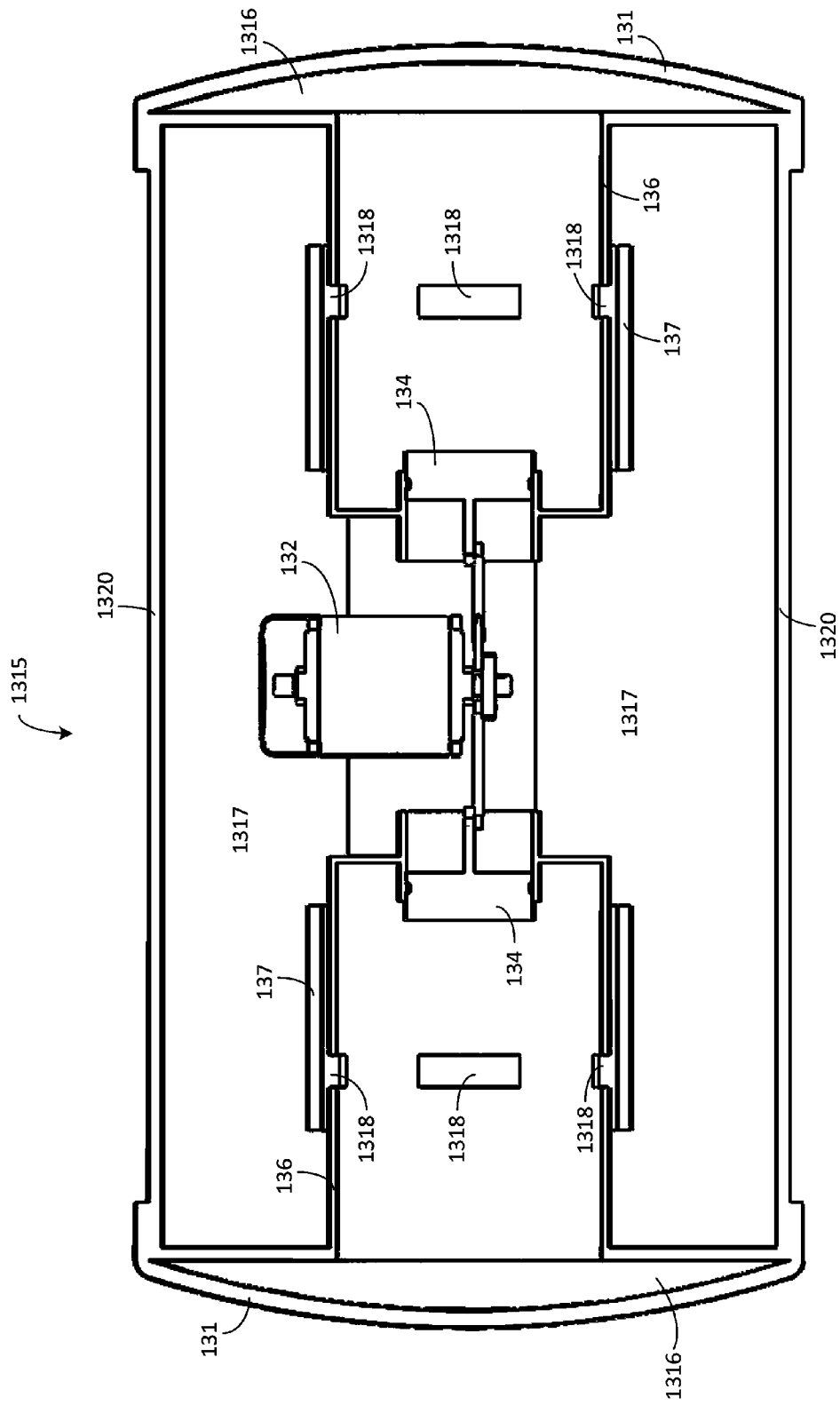

Referring to FIG. 13E, a cross-sectional view from directly above sound source 1315 is shown, according to an exemplary embodiment. Sound source 1315 includes rubber boots or membranes 131. Rubber boots or membranes 131 may be an elastomeric portion of sound source 1315. Sound source 1315 also includes outer wall 1320. Outer wall 1320 may be a rigid portion of sound source 1315. Sound source 1315 is also shown to include central tube 136. Central tube 136 may divide the volume inside sound source 1315 into first volume 1316 and second volume 1317. Central tube 136 includes a plurality of orifices 1318. Orifices 1318 may allow for the flow of gas between first volume 1316 and second volume 1317. Orifices 1318 may be covered and uncovered depending on the position of sleeves 137. Sleeves 137 may be a rigid, moveable member of sound source 1315. Motor 132 and pistons 134, which form part of the acoustical driver, are shown to be disposed within sound source 1315.

Figure 13F:
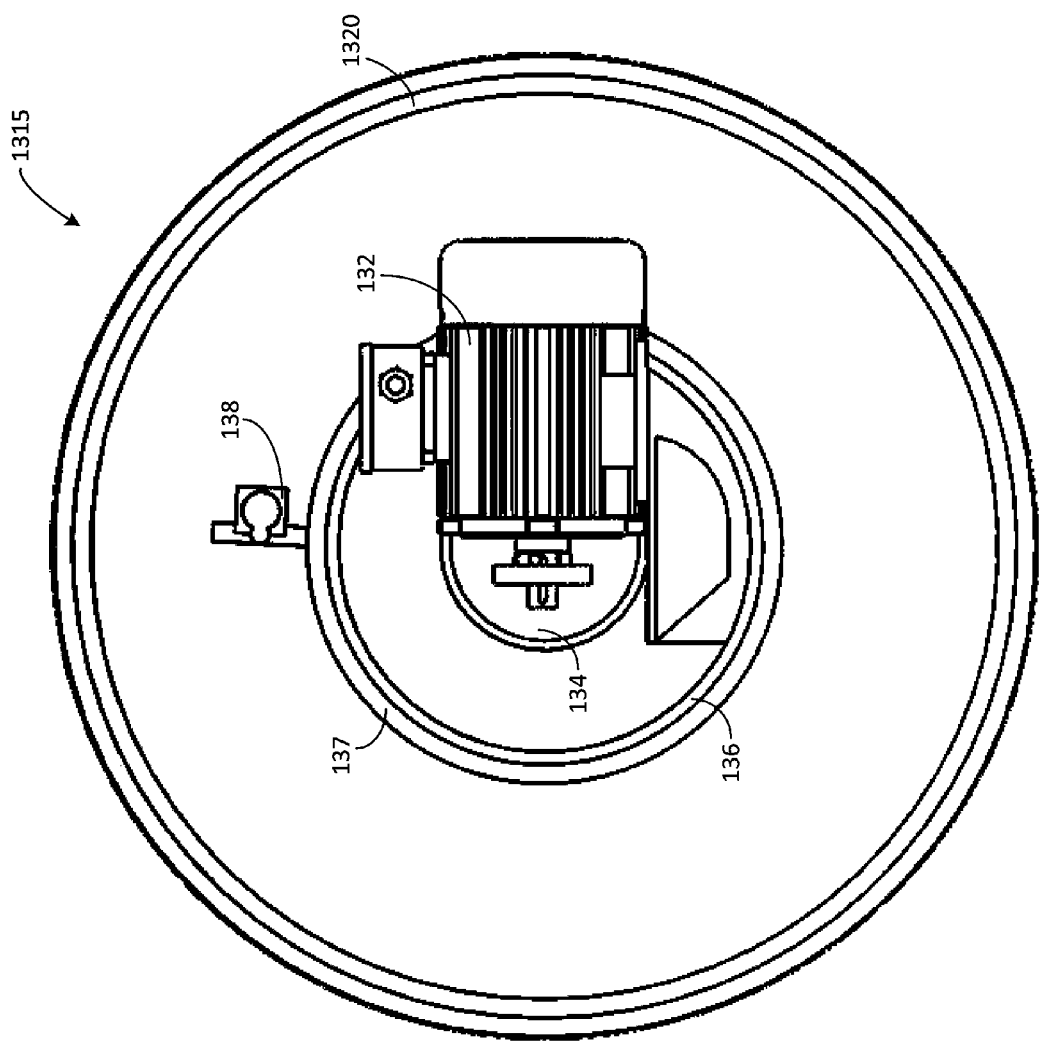

Referring to FIG. 13F, a cross-sectional view through the side and along the length of sound source 1315 is shown, according to an exemplary embodiment. Sound source 1315 includes outer wall 1320. Outer wall 1320 may be a rigid portion of sound source 1315. Sound source 1315 is also shown to include central tube 136 and sleeves 137. Sleeves 137 may be moved by actuator 138. Motor 132 and pistons 134, which form part of the acoustical driver, is shown to be disposed within sound source 1315.

Figure 14:
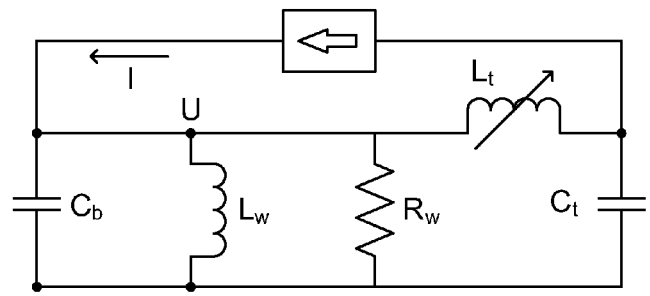
FIG. 14 is a diagram of an electrical circuit that may be used to simulate the sound source of FIG. 13A, according to an exemplary embodiment.

FIG. 14 is a simplified electrical circuit that may simulate the tunable resonator of FIG. 13A. The use of mathematical models of the acoustic properties of the bubble source to predict the main parameters of the bubble sound source was described in the description of FIG. 11 above. The frequency response $V_v(t)$ for the tunable bubble transducer is:

$$V_v(t) = \frac{j\omega L_t}{\left(1 + \left(\frac{1}{j\omega C_t} + j\omega L_t\right)\left(i\omega C_b + \frac{1}{j\omega L_w} + \frac{1}{R_w}\right)\right)} I, \quad (6)$$

where $R_w = \frac{\rho c}{A_a}$ is the radiation resistor, where $A_a$ is the area of aperture, $\rho$ is the water density, and c is the sound velocity;

$$L_w = R_w \frac{a}{c}$$

is the water inertia, where a is the radius of resonator;

$$C_t = \frac{V_2}{P_b \gamma}$$

is the compliance of gas within the volume $V_2$ behind the piston driver, where $P_b$ is the gas density;

$$L_t = \frac{\rho_g l}{A_t}$$

is the tunable variable inductance of gas between resonators, where l is the length of the path between the gas filled resonators, $A_t$ is the area of such path, and $\rho_g$ is the gas density;

$$C_b = \frac{V_b}{P_b \gamma}$$

is the compliance of gas of the main bubble volume $V_b$; $V_b$ is the main bubble volume; $V_2$ is the volume of second resonator behind the piston driver; and $\gamma=1.4$, the ratio of the specific heat at constant pressure to the specific heat at constant volume for gas within the bubble.

Figure 15:
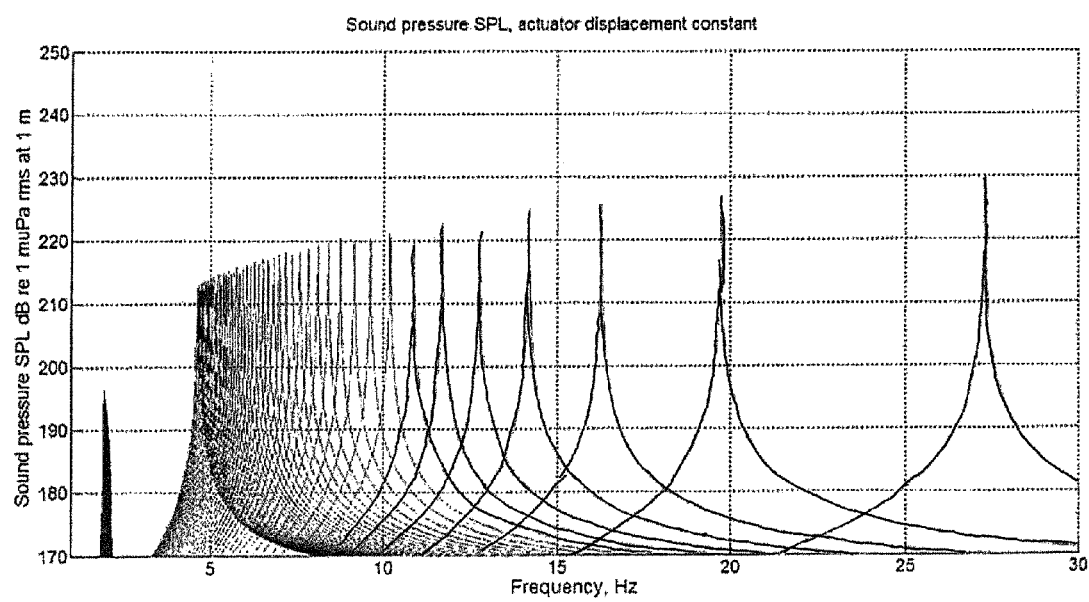
FIG. 15 is a graph depicting the simulated sound pressure levels of the sound source of FIG. 13A, with sleeve displacements varying from 0.01 m to 0.5 m, using the model electrical circuit of FIG. 15, according to an exemplary embodiment.

The results of the simulated sound pressure of the tunable projector are shown in the FIG. 15. FIG. 15 shows the variety of different resonance curves for sound pressure level (SPL) corresponding to different displacements of sleeves changing in the range from 0.01 m to 0.5 m. The resonance curves of FIG. 15 are similar to the resonance curves discussed in the description of FIG. 12. The parameters of the model are:
Sea depth: 30 m;
Diameter of internal resonator: 1.5 m;
Diameter of aperture: 2.0 m;
Length of air filled cylinder: 3.0 m;
Length of sleeves: 0.01 m-0.5 m.

Various embodiments discussed herein may have application in the 5 Hz-100 Hz frequency range for underwater ocean acoustic tomography, long-range acoustic navigation and communications and deep-bottom penetration seismic profiling in the offshore oil and gas industry. Variously embodiments may also be used in the 10 Hz-100 Hz frequency range for Artic/Antartic under-ice acoustic far-range navigation and communications, underwater global positioning systems (RAFOS), and long-range ocean acoustic tomography and thermometry. Various embodiments may provide a high efficiency broadband source in a low frequency band 5 Hz-400 Hz with a reasonably low cost. Various embodiments discussed herein may be used above water. Variable embodiments discussed herein may not be tunable.

What is claimed is:
1. A sound source, comprising:
    a bubble configured to be filled with a gas;
    a volume velocity actuator configured to perturb the gas within the bubble by changing a volume of the gas without adding gas to or removing gas from the bubble;
    a processing circuit configured to provide a source control signal to the volume velocity actuator to cause the volume velocity actuator to perturb the gas within the bubble at a frequency defined by the source control signal; and
    a resonant frequency control mechanism configured to keep a resonant frequency and a phase of a radiated signal of the sound source approximately equal to a frequency and a phase of the source control signal, wherein the resonant frequency control mechanism comprises:
        a rigid fixed member;
        at least one rigid movable member configured to move relative to the fixed rigid member, the at least one rigid movable member disposed substantially along an axis of the fixed rigid member, wherein the rigid movable member is coupled to a member actuator; and
        wherein the processing circuit is configured to provide a member control signal to the member actuator to move the at least one rigid movable member.

2. The sound source of claim 1, wherein the volume velocity actuator is disposed within the bubble.

3. The sound source of claim 1, wherein the volume velocity actuator is configured to perturb the gas within the bubble by periodically increasing and decreasing a velocity per unit area of the gas within the bubble.

4. The sound source of claim 3, wherein the volume velocity actuator comprises a plurality of movable members moving symmetrically.

5. The sound source of claim 4, wherein the volume velocity actuator comprises an electro-mechanical motor comprising a plurality of pistons symmetrically moving in opposite directions with a closed space between the plurality of pistons, wherein the volume velocity actuator is configured to change the volume and pressure inside the bubble proportionally to the source control signal.

6. The sound source of claim 1, wherein the bubble comprises an elastic material.

7. The sound source of claim 1, wherein the sound source has a resonant frequency and the volume velocity actuator has a resonant frequency, wherein the sound source resonant frequency and the volume velocity actuator resonant frequency are about the same.

8. The sound source of claim 1, wherein the at least one rigid movable member is configured to lengthen or shorten the sound source, wherein a length of the sound source determines the resonant frequency of the sound source.

9. The sound source of claim 8, further comprising a sensor configured to sense sound generated by the sound source and to transmit a sensed signal to the processing circuit, wherein the processing circuit is configured to move the at least one rigid movable member to keep a resonance frequency and phase of the sound source approximately equal to a frequency and phase of the sensed sound.

10. The sound source of claim 9, wherein the processing circuit is configured to detect a phase difference between the sensed signal and the velocity control signal and to move the at least one rigid movable member based on the phase difference.

11. The sound source of claim 9, wherein the processing circuit is configured to control the sound source to perform a linear sweep of frequencies, wherein the processing circuit is further configured to move the at least one rigid movable member to keep the resonance frequency and the phase of the sound source approximately equal to a frequency and a phase of the sensed sound across at least a portion of the linear sweep of frequencies.

12. A method of generating underwater sound waves, comprising:
providing a sound source into an underwater environment, the sound source comprising:
an elastic bubble configured to be filled with a gas;
a volume velocity actuator configured to perturb the gas within the bubble by changing a volume of the gas without adding gas to or removing gas from the bubble;
a processing circuit configured to provide a source control signal to the volume velocity actuator to cause the volume velocity actuator to perturb the gas within the bubble at a frequency defined by the source control signal; and
a resonant frequency control mechanism configured to keep a resonant frequency and a phase of a radiated signal of the sound source approximately equal to a frequency and a phase of the source control signal, wherein the resonant frequency control mechanism comprises:
a rigid fixed member;
at least one rigid movable member configured to move relative to the fixed rigid member, the at least one rigid movable member disposed substantially along a same axis as the rigid fixed member, wherein the at least one rigid movable member is coupled to a member actuator; and
wherein the processing circuit is configured to provide a member control signal to the member actuator to move the at least one rigid movable member;
perturbing the gas within the bubble by periodically changing the volume of the gas without adding gas to or removing gas from the bubble; and
controlling the perturbing of the gas within the bubble to emit sound waves over a plurality of frequencies.

13. The method of claim 12, wherein the perturbing of the gas further comprises perturbing the gas from a source disposed within the bubble.

14. The method of claim 12, wherein the controlling further comprises generating a digitally synthesized signal waveform and providing the digitally synthesized signal waveform to the volume velocity actuator.

15. The method of claim 12, further comprising controlling a resonance frequency of the sound source to approximately equal the frequency of the radiated signal of the sound source.

16. The method of claim 15, wherein the resonance frequency of the sound source is controlled by moving the at least one rigid movable member to lengthen or shorten the sound source, wherein a length of the sound source determines the resonant frequency of the sound source.

17. The method of claim 12, wherein the controlling further comprises perturbing the gas to emit sound waves over a linear sweep of frequencies and controlling a resonance frequency of the sound source to approximately equal a frequency of sensed sound across at least a portion of the linear sweep of frequencies.

18. The method of claim 12, wherein the perturbing further comprises continuously increasing and decreasing a pressure of the gas within the bubble.

* * * * *